United States Patent [19]

Moskovich

[11] Patent Number: 4,776,681
[45] Date of Patent: * Oct. 11, 1988

[54] PROJECTION LENS

[75] Inventor: Jacob Moskovich, Cincinnati, Ohio

[73] Assignee: U.S. Precision Lens, Incorporated, Cincinnati, Ohio

[*] Notice: The portion of the term of this patent subsequent to Jul. 22, 2004 has been disclaimed.

[21] Appl. No.: 899,543

[22] Filed: Aug. 22, 1986

Related U.S. Application Data

[63] Continuation-in-part of Ser. No. 820,553, Jan. 17, 1986, Pat. No. 4,605,774.

[51] Int. Cl.$^4$ .................. G02B 13/18; G02B 9/34; G02B 9/60; G02B 9/62
[52] U.S. Cl. .................. 350/432; 350/412; 350/464; 350/465; 350/469
[58] Field of Search .............. 350/412, 432, 464, 469, 350/481, 465

[56] References Cited

U.S. PATENT DOCUMENTS

| 2,417,330 | 3/1947 | Strang | 350/481 |
| 2,440,088 | 4/1948 | Grey | 350/453 |
| 2,468,564 | 4/1949 | Luneburg | 350/432 |
| 2,479,907 | 8/1949 | Cox | 350/432 |
| 2,502,543 | 4/1950 | Warmisham | 350/432 |
| 2,552,672 | 5/1951 | Grey | 350/432 |
| 2,638,034 | 5/1953 | Wreathall | 350/432 |
| 2,660,094 | 11/1953 | Wreathall | 350/432 |
| 2,737,849 | 3/1956 | Tiller | 350/469 |
| 2,865,253 | 12/1958 | Thielens | 350/481 |
| 3,429,997 | 2/1969 | Rosner et al. | 350/438 |
| 3,567,304 | 3/1971 | Kruger | 350/481 |
| 3,778,133 | 12/1973 | Tatian | 350/432 |
| 3,800,085 | 3/1974 | Ambata et al. | 350/420 |
| 3,817,604 | 6/1974 | Watt | 350/481 |

(List continued on next page.)

FOREIGN PATENT DOCUMENTS

| 57-101812 | 6/1982 | Japan . |
| 57-108815 | 7/1982 | Japan . |
| 57-108818 | 7/1982 | Japan . |
| 57-177115 | 10/1982 | Japan . |
| 58-118616 | 7/1983 | Japan . |
| 58-125007 | 7/1983 | Japan . |
| 58-139110 | 8/1983 | Japan . |
| 58-139111 | 8/1983 | Japan . |
| 58-140708 | 8/1983 | Japan . |
| 59-121016 | 7/1984 | Japan . |
| 59-133517 | 7/1984 | Japan . |
| 59-133518 | 7/1984 | Japan . |
| 200216 | 2/1985 | Japan . |
| 200215 | 8/1985 | Japan . |
| 593514 | 10/1947 | United Kingdom . |
| 1269133 | 4/1972 | United Kingdom . |

OTHER PUBLICATIONS

Printed Publication—Diagram of a Lens Entitled, Advent Lens Mod II.
Printed Publication—pp. 470–482 of a Volume Entitled, A System of Optical Design, by Cox.

Primary Examiner—John K. Corbin
Assistant Examiner—Scott J. Sugarman
Attorney, Agent, or Firm—Costas & Montgomery

[57] ABSTRACT

A projection lens for a cathode ray tube consisting from the image end of a first lens unit including an element of overall meniscus shape and of positive power at the optical axis, a second lens unit which includes of a biconvex element and supplies the majority of the positive optical power of the lens, the biconvex element being of glass and having spheric surfaces, a third lens unit adjacent the cathode ray tube having a strongly concave image side surface and serving as a field flattener, and a corrector lens unit having at least one aspheric surface, the corrector unit being axially spaced from the second lens unit a distance such that the axial marginal rays from the second lens unit, as traced from the long cojugate intersect the image side surface of the corrector unit at a height from the optical axis that is less than the clear aperture of said corrector lens unit. The corrector lens unit is shaped to correct for off-axis aberrations above the intersection. The first lens unit is of a positive power which will converge rays as traced from the long conjugate and thereby reduce the diameter of the second lens unit.

88 Claims, 5 Drawing Sheets

U.S. PATENT DOCUMENTS

| | | | |
|---|---|---|---|
| 3,868,173 | 2/1975 | Miles et al. | 350/432 |
| 3,951,523 | 4/1976 | Nishimoto | 350/432 |
| 3,980,399 | 9/1976 | Howden | 350/432 |
| 3,998,527 | 12/1976 | Ikeda et ala. | 350/432 |
| 4,099,848 | 7/1978 | Osakabe | 350/432 |
| 4,181,409 | 1/1980 | Whitney et al. | 350/432 |
| 4,240,701 | 12/1980 | Lyrle | 350/432 |
| 4,300,817 | 11/1981 | Betensky | 350/412 |
| 4,348,081 | 9/1982 | Betensky | 350/412 |
| 4,397,520 | 8/1983 | Neil | 350/481 |
| 4,474,437 | 10/1984 | Gorenstein | 350/432 |
| 4,479,695 | 10/1984 | Neil | 350/432 |
| 4,530,575 | 7/1985 | Yamakawa et al. | 350/432 |
| 4,548,480 | 10/1985 | Yamamoto et al. | 350/432 |
| 4,561,736 | 12/1985 | Furter et al. | 350/432 |
| 4,564,269 | 1/1986 | Uejara | 350/432 |
| 4,577,935 | 3/1986 | Yamakawa et al. | 350/432 |
| 4,595,263 | 6/1986 | Clarke | 350/432 |
| 4,603,950 | 8/1986 | Uehara et al. | 350/432 |
| 4,620,773 | 11/1986 | Fukuda | 350/432 |
| 4,682,862 | 7/1987 | Moskovich | 350/432 |
| 4,685,774 | 8/1987 | Moskovich | 350/432 |
| 4,697,892 | 10/1987 | Betensky | 350/432 |
| 4,707,084 | 11/1987 | Betensky | 350/432 |

PROJECTION LENS

RELATED APPLICATIONS

This application is a continuation-in-part of application Ser. No. 820,553 filed Jan. 17, 1986, now U.S. Pat. No. 4,685,774.

FIELD OF THE INVENTION

This invention relates to projection lenses, and more particularly, relates to projection lenses for cathode ray tubes (CRT) and wide screen television.

BACKGROUND OF THE INVENTION

A preferred form of projection lenses for wide screen television is disclosed in U.S. Pat. Nos. 4,300,817, 4,348,081, and 4,526,442, all assigned to the assignee of the present application.

In these previous patents, the lens units have been referred to as groups which perform specified optical functions. However, in accordance with present United States Patent and Trademark Office requirements, the overall lens will be defined in terms of "lens units". It will be understood that the term "units" refers to one or more optical elements or components air spaced from another optical unit.

It is well known that a specified or defined optical function(s) of a lens unit or group in an overall lens may be accomplished by using one element or component or more than one element or component dependent upon the correction or function desired. A decision as to whether one or more elements is used as a lens unit in an overall lens design may be based on various considerations, including but not limited to, ultimate performance of the lens, ultimate costs of the lens, acceptable size of the lens, etc. Accordingly, in the following specification and appended claims, the term "lens unit" refers to one or more lens element or lens components which provide a defined optical function or functions in the design of the overall lens.

The lenses disclosed in the forementioned patents generally comprise three lens units: from the image end a first lens unit, having at least one aspheric surface, which serves as an aberration corrector; a second lens unit including a biconvex element which supplies all or substantially all of the positive power of the lens; and a third lens unit having a concave surface towards the image end of the lens, serving as a field flattener, and essentially correcting for Petzval curvature of the lens.

The lenses, as disclosed, are designed for use with a surface of a cathode ray tube (CRT). The lenses of U.S. Pat. No. 4,300,817, utilizing a single biconvex element in the second lens unit, all have an equivalent focal length (EFL) of one hundred twenty-seven millimeters or greater, while the lenses of U.S. Pat. No. 4,348,081, which utilize a two-element second lens unit, including the biconvex element, may have an EFL reduced to eighty-five millimeters as designed for direct projection for a five inch diagonal CRT. The lenses described in U.S. Pat. No. 4,526,442 are designed to have a fold in the optical axis between the first and second lens units and have been designed so that the EFL is as low as one hundred twenty-six millimeters. These EFL's are also for CRT screens having a viewing surface with an approximate five inch diagonal.

Projection TV sets are rather bulky and have required high volume cabinets. One manner of reducing the cabinet size is to decrease the EFL of the projection lenses. This, of course, increases the field angle of the lens.

The EFL of the lens is a function of the total conjugate distance between the CRT and the display screen. This is shown by the relationship $$OL = EFL\,(1+1/M) + EFL\,(1+M)$$

where

OL is the overall conjugate distance of the system from object to image

EFL $(1+M)$ is the distance from the image to the first principal point of the lens EFL $(1+1/M)$ is the distance from the object to the second principal point of the lens and M is the magnification of the system expressed as the ratio of object height to image height.

Therefore, in order to decrease the total distance between the CRT and the screen, it is necessary to reduce the EFL, or alternately stated, increase the field angle of the lens.

An effect of increasing the angular coverage of the lens as a result of decreasing the EFL is that the aberrations become more difficult to correct.

A further consideration is introduced wherein a spacing is provided between the phosphor screen of the CRT and the third lens unit of the projection lens. This spacing may be required for the inclusion of a liquid cooling and/or optical coupling material and a housing necessary to enclose the coolant against the face of the CRT. This additional spacing between the face of the CRT causes the third negative lens unit to contribute more negative power, which must be compensated by increased power in the positive second lens unit. In some cases, the phosphor surface of the CRT is curved convex to increase the corner brightness. This permits a power reduction in the third group inasmuch as the power requirement for correction of field curvature is reduced.

A single biconvex element second lens unit, as shown in the aforementioned patents, does not provide the lens designer adequate degrees of freedom to correct for the resulting astigmatism and distortion. By dividing the optical power of the second lens unit, as disclosed in U.S. Pat. No. 4,348,081, a better control of aberrations can be obtained for a shorter EFL. However, merely splitting the optical power of the second lens unit into two elements to obtain additional degrees of optical design freedom does not provide acceptable contrast and resolution where the angular coverage of the projection lenses is required to be in excess of twenty-seven degrees, semi-field.

Since the advent of lenses, as shown in U.S. Pat. No. 4,300,817, which made large screen home projection television sets feasible, there has been continuing efforts to design projection lenses with wider field angles which are more compact, and easier to manufacture at the greatest economy. This, of course, is an effort to reduce the cost of the lens and reduce the depth of the housing of the television system while maintaining or increasing the size of the viewing screen.

Projection lens of the overall type described have been designed with decreased EFL's by designing a more complex second lens unit split into more than one lens element, as exemplified in the lenses disclosed in co-pending application Ser. Nos. 642,825 and 652,062, filed Aug. 21, 1984 and Sept. 19, 1984, respectively now U.S. Pat. Nos. 4,697,892 and 4,707,684, respectively.

These designs are currently used on many wide screen projection television sets and may have an equivalent focal length as low as eighty millimeters. It will be understood that the EFL will be greater if there is a fold in the optical axis between the first and second lens units.

Co-pending application Ser. No. 776,140, filed Sept. 13, 1985, discloses projection lenses in which the EFL is reduced to less than sixty millimeters for an object height of approximately five inches.

These lenses use a negative first lens unit to aid in correction of field curvature due to the large positive power of the second lens unit and increased field angle. This approach works very well and leads to high quality optical performance of the lens. However, it requires large diameter positive elements in the second lens unit to accommodate the diverging bundle of light (as traced from the long conjugate). This construction also requires a lens of relatively long front vertex distance (FVD), largely due to a long space between the first negative element and the following power unit, which is necessary to use to achieve an appropriate correction of field curvature and astigmatism. The front vertex distance is the distance from the image side of the first lens unit to the face place of the CRT.

The related co-pending application discloses a lens of the type described, which consists of a first lens unit which comprises a single element with two aspheric surfaces, and an overall positive meniscus shape preferably convex to the image end, a second positive element, and a third lens unit having a strongly negative surface concave to the image end. The first lens element is of positive optical power at the optical axis of the lens, but due to the aspheric power of the surfaces, the positive optical power decreases with distance from the optical axis and may become strongly negative at or closely adjacent the clear aperture of the first lens element, as hereinafter explained.

The strong negative power of the third lens unit contributes to correction of the Petzval sum of other lens elements. The strongly concave surface may be made aspheric to also correct for residual astigmatism and field curvature of the lens. The second lens element provides the majority of the positive power of the lens and some correction for astigmatism. The first lens element must then correct the aperture dependent aberrations, particularly, spherical and coma. Lenses as described in the related co-pending application are very compact, having the first and second lens units spaced more closely than heretofore. Lenses as described may have a field angle as great as 73° while comprising only three elements.

In lenses of the type described in U.S. Pat. No. 4,300,817, all the elements are made out of acrylic because of simplicity of manufacturing aspherical surfaces on plastic. However, the refractive index of acrylic varies significantly with temperature. This leads to a change in focal lengths of the acrylic lens elements, which in turn, can lead to defocus or lack of sharp focus of the overall lens.

One way of compensating for focus shift with temperature is to design a lens mount and lens barrel using a bi-metallic plate or other means that will shift the position of the lens relative to the CRT as a function of temperature in such a way that the focus of the lens will remain in a constant position. Alternatively, the second or power lens unit may be formed of glass, as disclosed in U.S. Pat. No. 4,348,081, which does not exhibit any substantial change in index of refraction with temperature. However, this restricts the lens designer in that it is very expensive to define an aspheric surface on glass. A further solution is to design a hybrid lens using a glass power unit with an additional acrylic corrector with one or more aspheric surfaces adjacent the power unit. However, this does not necessarily provide a lens with a wider field angle and decreased length.

To reduce the cost of manufacturing projection lenses, it is desirable to decrease the size of the elements. In the present invention, a positive first lens unit is utilized to reduce the diameter of the other elements of the lens. This is achieved through the use of a positive first lens unit preferably in the overall form of a meniscus which converges the rays toward the strongly positive second lens unit (as traced from the long conjugate side). The spacing between the first lens unit and the second lens unit is thereby reduced, which results in a reduction in the front vertex distance of the lens.

SUMMARY OF THE INVENTION

The present invention utilizes the general form of the lens of the aforementioned related co-pending application, but utilizes a spherical glass element for the second group and adds an aberration correction element having at least one aspheric surface between the second and third lens units. The correction element is of weak optical power and temperature variations do not noticeably affect the focus of the overall lens. Moreover, the positioning of the correction element with respect to the second lens unit is such that it permits better correction for aberrations due to off-axis rays. The first lens unit comprises a first lens element having a positive element of meniscus shape, which is spaced a predetermined distance from the second lens unit in order to converge the rays (as traced from the long conjugate) and reduce the diameter of the second lens unit, and thus provide a more compact lens. Moreover, the shape of the first lens unit and the corrector element is chosen so that there is minimal deviation in thickness from the axis to the clear aperture. This allows for greater accuracy to be achieved in molding these acrylic elements, economically.

Lens embodying the invention may have semi-field angles of thirty degrees and greater, and are of reduced physical size. For example, a projection lens for a forty-five inch diagonal viewing screen may have an equivalent focal length of 68.2 mm and a front vertex distance as low as 114.6 mm, with a 38° semi-field angle.

An object of this invention is to provide a new and improved projection lens of the type described, having a wider field angle and consisting of as little as four lens elements.

Another object of this invention is to provide a more compact lens of the type described.

The features of the invention which are believed to be novel are particularly pointed out and distinctly claimed in the concluding portion of the specification. The invention, however, together with further objects and advantages thereof, may best be appreciated by reference to the following detailed description taken in conjunction with the drawings.

DETAILED DESCRIPTION OF PREFERRED EMBODIMENTS OF THE INVENTION

Figure 1:
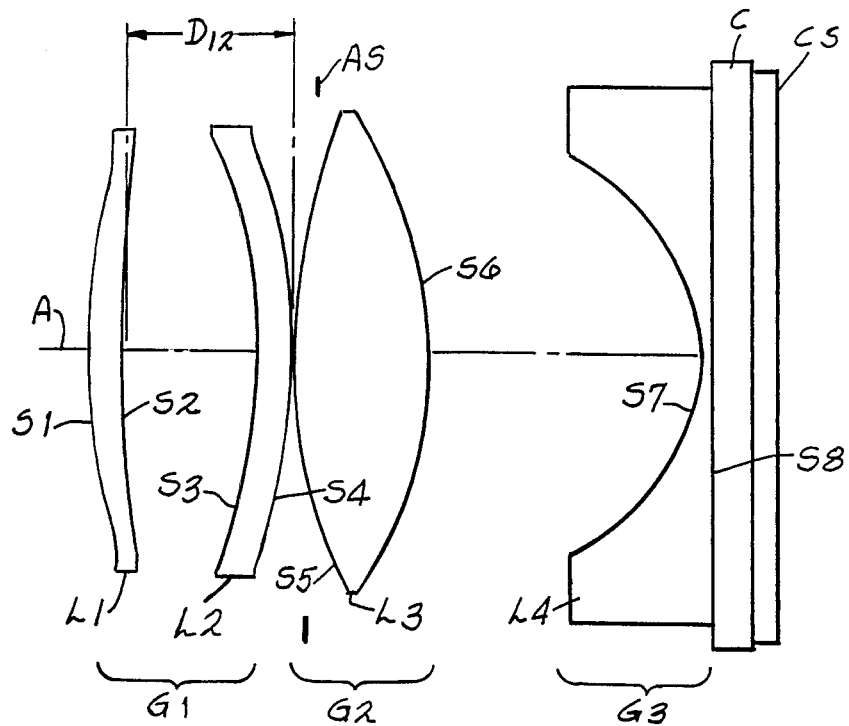
FIG. 1 is a schematic side elevation of a lens embodying the invention.

Different projection lenses embodying the invention are set forth in Tables I–XI and exemplified in the drawings.

In the drawings, the lens units are identified by the reference G followed by successive arabic numerals except that a corrector lens unit is designated by the reference CR; lens elements are identified by the reference L followed by successive arabic numerals from the image to the object end. Surfaces of the lens elements are identified by the reference S followed by successive arabic numerals from the image to the object end. The reference SC denotes the screen of a cathode ray tube while the reference C denotes a liquid optical coupler between the screen SC and the overall lens. In the embodiments of FIGS. 3, 4, 5, 7, and 8, the coupler C contributes optical power as hereinafter explained.

In all disclosed embodiments of the invention, the first lens unit G1 comprises an element of positive power and an overall positive shaped meniscus, and has at least one aspheric surface defined by the equation $$x = \frac{Cy^2}{1 + \sqrt{1 - (1+K)C^2y^2}} + Dy^4 + Ey^6 + Fy^8 + Gy^{10} + Hy^{12} + Iy^{14}$$

where x is the surface sag at a semi-aperture distance y from the axis A of the lens C, is the curvature of a lens surface at the optical axis A equal to the reciprocal of the radius at the optical axis, K is a conic constant, and D, E, F, G, H and I are aspheric coefficients of correspondingly 4th through 14th order. In two embodiments of the invention, the first lens unit further comprises a meniscus convex to the power unit G2 and closely spaced to that unit.

The second lens unit G2 is biconvex and preferably consists of a single biconvex element having spherical surfaces, and is of a glass material to minimize the variation of refractive index with temperature.

The third lens unit G3 in all embodiments acts as a field flattener, that is, it corrects any Petzval curvature of the first and second lens units. The concave image side surface of the third lens unit G3 may be spherical or aspheric, as hereinafter set forth. As disclosed in U.S. Pat. No. 4,685,774. The spacing $D_{12}$ between the first element of lens unit G1 and lens unit G2 is important in aiding in the correction of field curvature. The spacing $D_{12}$ between the first and second lens units should be $$0.10 < |D_{12}/F_3| < 0.48$$

where $F_3$ is the equivalent focal length of the third lens unit.

If $|D_{12}/F_3|$ goes below 0.10, the field curvature becomes overcorrected and the image quality becomes unacceptable. If $|D_{12}/F_3|$ exceeds 0.48, the field curvature is undercorrected and the image quality is again not acceptable.

As one attempts to increase the field angle of the lens, more astigmatism is introduced. This may be corrected at the expense of correction of spherical aberration in the second lens unit G2.

The lens unit G1 then must correct for the spherical aberration introduced by lens unit G2 as well as coma and some other off-axis aberrations.

This is achieved by providing element L1 with two aspheric surfaces S1 and S2, which define element L1 as having positive optical power at the optical axis which decreases with distance from the optical axis and may change to negative optical power, which becomes very strong at the limit of the clear aperture.

In Table XIII, there is set forth the aspheric optical power $K_{CA}/K_A$ of the first lens element L1 of each prescription at or adjacent the clear aperture from the optical axis to the limit of the clear aperture or just adjacent the limit of the clear aperture. In each case the power at the optical axis is positive and decreases with height y and may become negative and then increases in negative power to an absolute value at least two and one-half times the optical power at the axis with one exception. These relationships are based on "thin lens" equations and do not take into account the thickness of the lens. These relationships exemplify the change in optical power of the lens element L1 from the optical axis to the limit of the clear aperture of the lens.

The aspheric optical power $K_y$ is calculated from the equation $$K_y = (n-1)(C_{1y} - C_{2y})$$

where n is the index of refraction of lens element L1, $C_{1y}$ is the local curvature of the first lens surface at a height y from the optical axis A, and $C_{2y}$ is the local curvature of the second lens surface at the height y from the optical axis.

FIG. 1 exemplifies a lens as disclosed in U.S. Pat. No. 4,685,774 but in which the first lens unit G1 includes a second element L2 which is a meniscus convex to lens unit G2.

This lens is shown for use with a flat CRT faceplate SC and therefore requires a greater degree of curvature on surface S7 of element L4 for correction of field curvature. The greater the field angle of the lens and the stronger the negative power of the concave surface S7, the greater the amount of sagittal oblique spherical aberration that will be introduced. This is corrected by a meniscus corrector lens unit L2, as shown in FIG. 1, which is convex to the power unit G2. Thus, the shape and function of element L2 in FIG. 1 is primarily to contribute to correction of sagittal oblique spherical aberration. Element L2 is of very weak positive power and could go to weak negative power, depending on the overall design of the lens, as described in co-pending application Ser. No. 899,477, filed on the same date as this application, now U.S. Pat. No. 4,682,862, the disclosure of which is incorporated by reference. A lens as shown in FIG. 1 is substantially described in Table I.

As will be hereinafter pointed out, if the phosphor screen of the CRT screen is convex, and in some cases aspheric, the burden placed on the field flattener G3 is reduced and the power of the concave surface thereof may be reduced.

Figure 2:
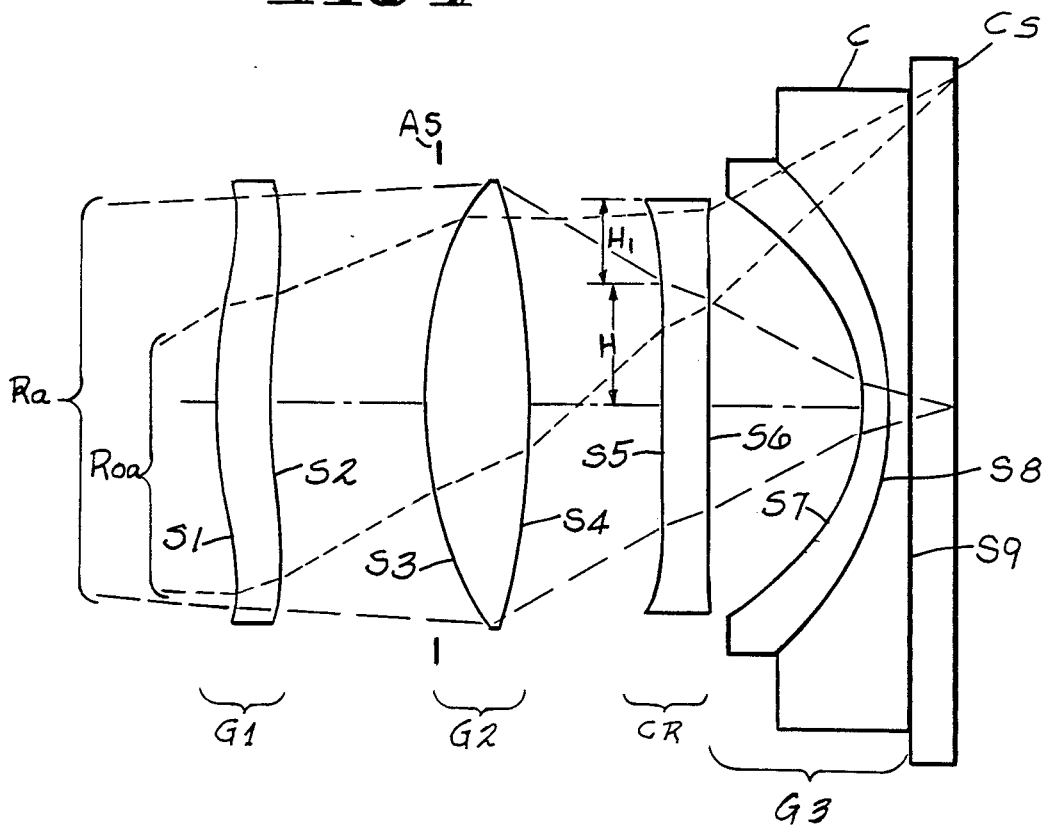
FIG. 2 is a schematic side elevation of a lens embodying the invention showing axial and off-axis rays traced from the long conjugate.

Reference is now made to FIG. 2 which shows a ray trace from the long conjugate side of axial rays $R_A$ and off-axis rays $R_{OA}$ in a lens embodying the invention.

The element L1 of lens unit G1 converges the axial rays $R_A$ within the clear aperture of element L2 of lens unit G2. Element G2 then converges the axial rays $R_A$ to a height H on corrector lens unit L3, which is substantially less than the clear aperture of element L3.

If the axial bundle denoted by rays $R_A$ is held to a small height H at corrector lens unit L3, then the outer dimensions of L3, $H_1$, can be utilized to correct for the off-axis bundle denoted by $R_{OA}$. That is, the designer is given more freedom in correcting for aperture dependent residual spherical within the dimension H, and other aberrations in the dimension $H_1$. These aberrations may be coma, astigmatism and sagittal oblique spherical. The spacing $D_{2C}$ between the second lens unit G2 and the corrector lens unit L3 is selected so that the marginal axis rays $R_A$ converge to a height H on the correction lens unit. This height H may vary dependent on the shape of the corrector lens unit and the spacing $D_{2C}$ from lens unit G2. The height H as related to one-half the clear aperture CA/2 of the corrector lens unit is preferably in the range of $0.92 \geq 2H/CA \geq 0.5$. The actual height for each of the lenses is set forth in Table XIII under the heading Unit C, 2H/CA.

The spacing between the element L1 of lens unit G1 and element L2 of lens unit G2 should be $$0.5 > |D_{12}/F_3| > 0.1$$

where $D_{12}$ is the spacing between L1 and L2 and $F_3$ is the equivalent focal length of the third lens unit G3.

The spacing $D_{2C}$ between the second lens unit G2 and corrector lens unit L3 is $$0.4 > D_{2C}/F_0 > 0.1$$

where $F_0$ is the equivalent focal length of the overall lens.

If $D_{2C}$ becomes too large, the ability to correct aperture dependent aberrations is lost because the height H of the axial ray bundle $R_A$ becomes too low at L3.

If $D_{2C}$ becomes too small, H increases, $H_1$ decreases, and the ability to influence off-axis aberrations is decreased.

The positive first lens unit G1 together with the overall meniscus shape thereof permits the diameter of the second lens unit G2 to be reduced. This reduction also reduces the height of the marginal rays, permitting a reduction in diameter of the following lens elements.

A lens as shown in FIG. 2 is substantially described in Table II.

Figure 3:
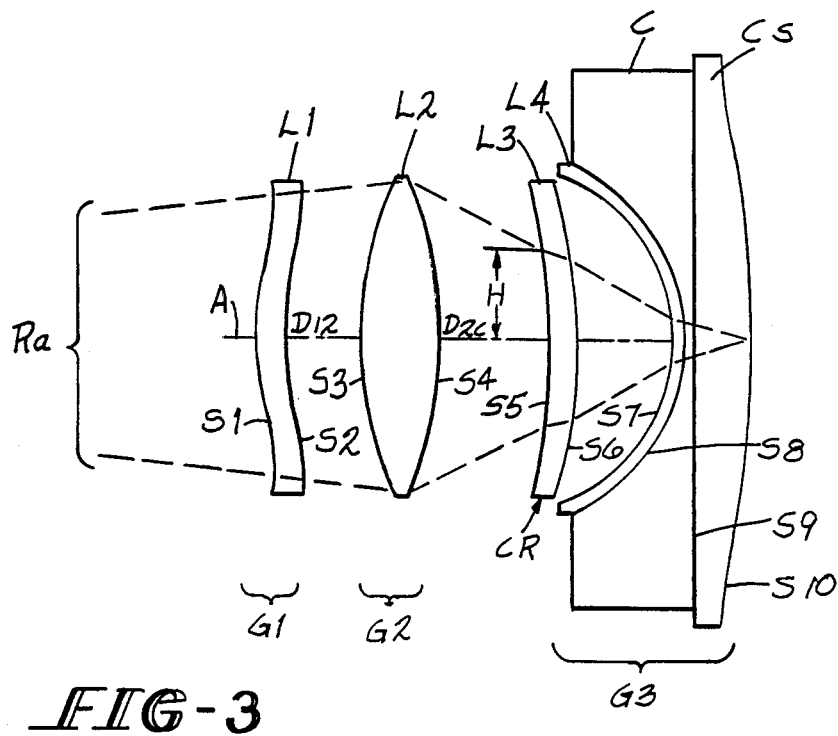
FIGS. 3-10 are schematic side elevations of additional lenses embodying the invention.
Figure 4:
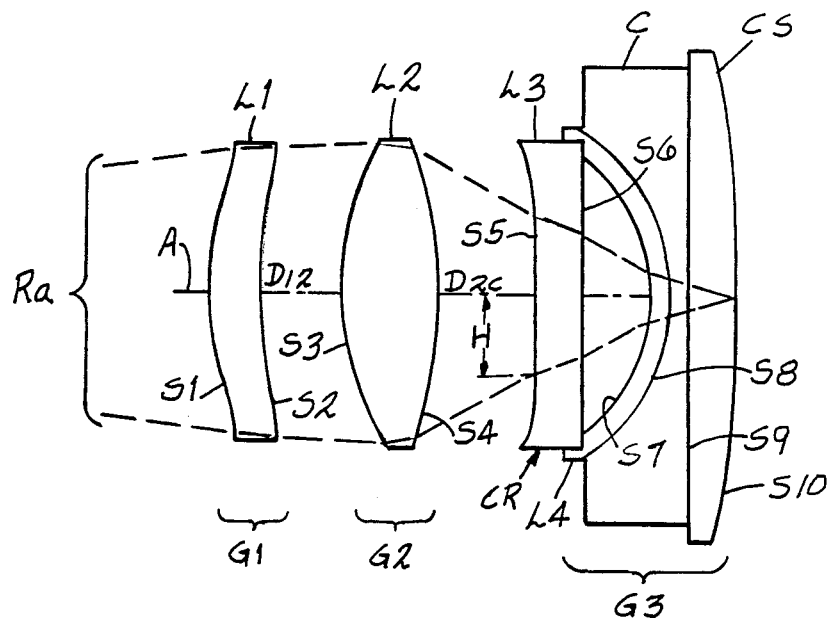
Figure 5:
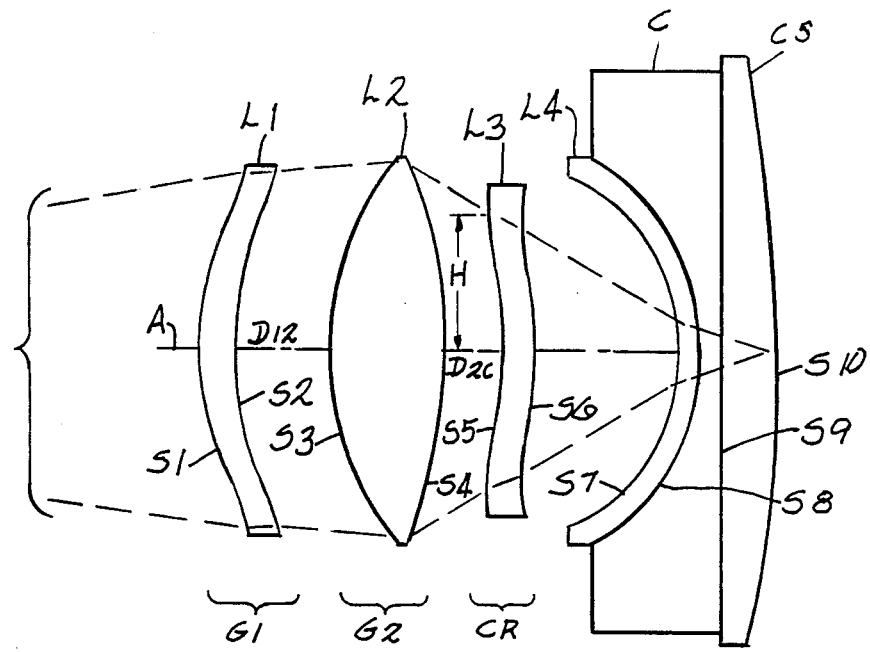

FIGS. 3, 4 and 5 exemplify additional embodiments of the invention which are substantially described in Tables III, IV and V, respectively.

Figure 6:
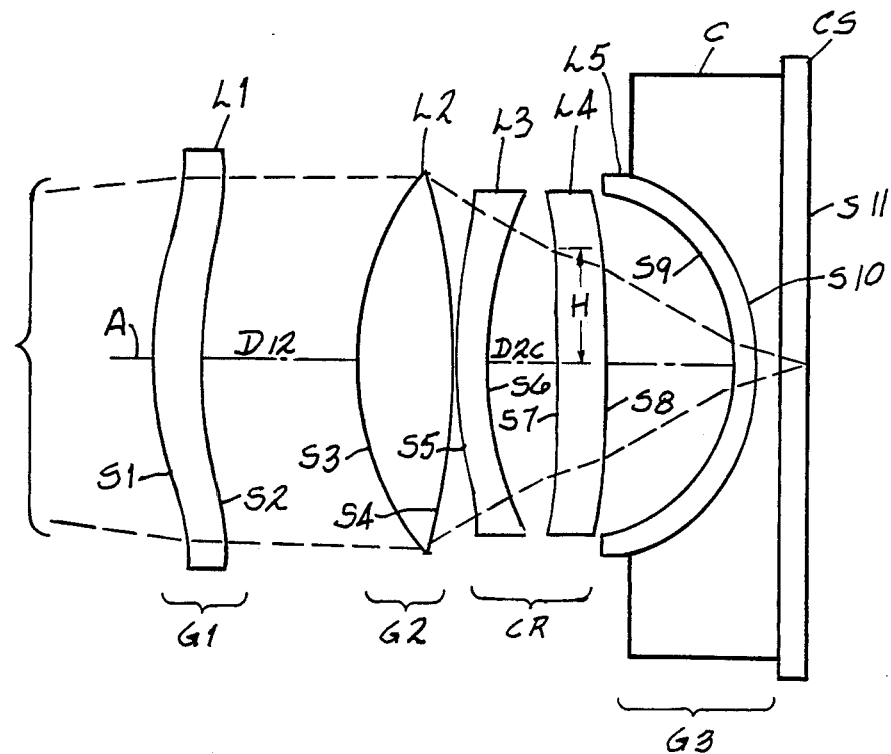

FIG. 6 exemplifies an additional embodiment of the invention. The lens of FIG. 6 is shown with a planar CRT faceplate CS. As is hereinafter pointed out, this requires more power in the third lens unit G3, which then contributes more sagittal oblique spherical aberration. This is corrected by the meniscus element L3 convex to the power unit G2 and closely spaced to lens unit G2. The element L3 in FIG. 6 provides the same function as the element L2 in FIG. 1. A lens as shown in FIG. 6 is substantially described in Table VI.

Figure 7:
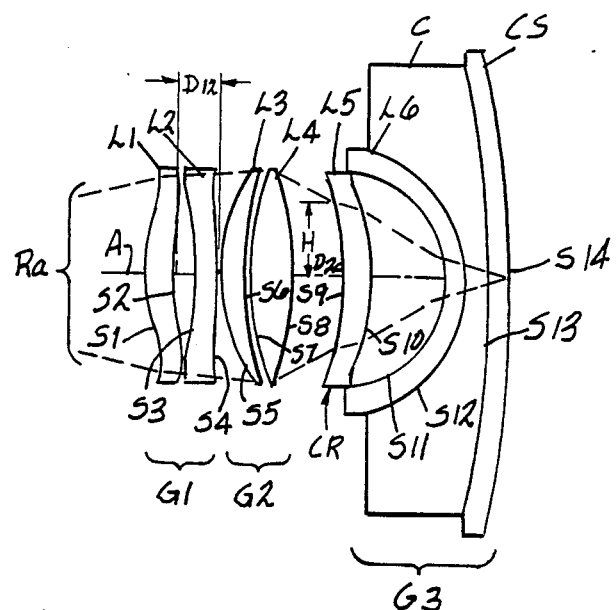

FIG. 7 exemplifies a further embodiment of the invention where the second lens element G2 is split into two elements L3 and L4 to avoid too much power in one element and resultant aberrations. The CRT faceplate CS is of meniscus shape convex to the phosphor side. This aids in decreasing the power of the third lens unit. However, in view of the large field angle of this lens (almost 44° semi-field), lens element L2 is provided to contribute to correction of sagittal oblique spherical aberration. A lens, as shown in FIG. 7, is substantially described in Table VII.

Figure 8:
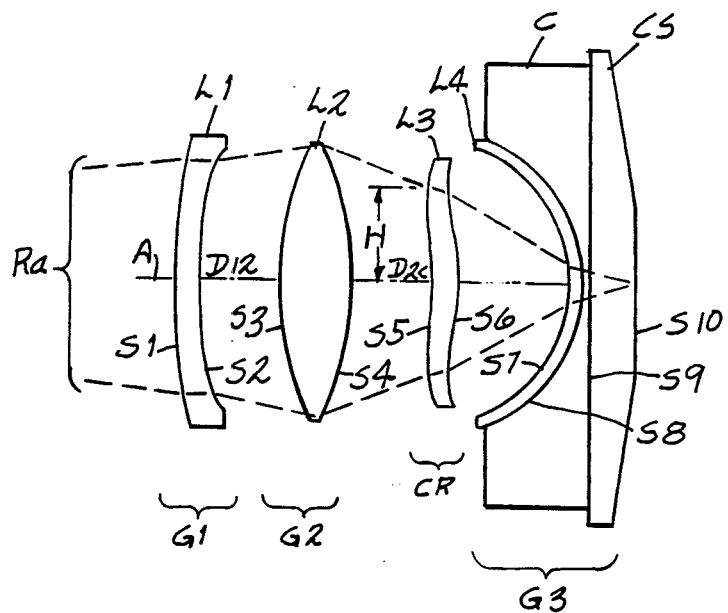
Figure 9:
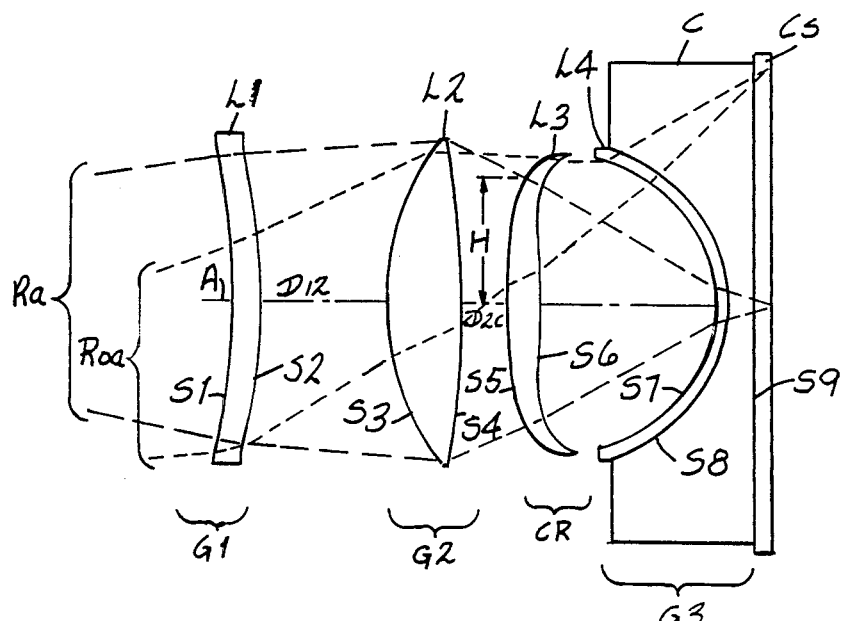
Figure 10:
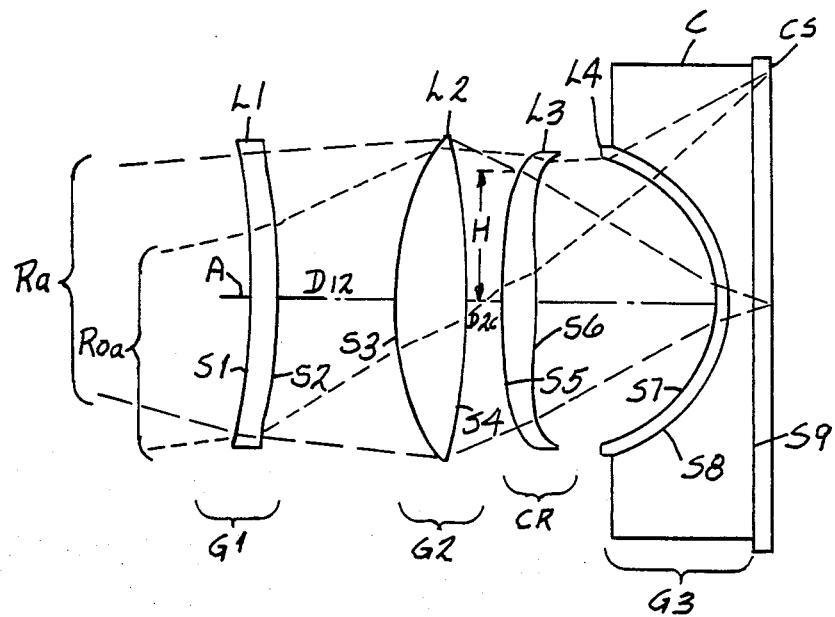

FIGS. 8, 9, and 10 exemplify further embodiments of the invention in which element L1 and the corrector lens unit CR take different shapes. In all of FIGS. 8–10, the first element L1 and lens unit G1 are overall positive meniscii relatively closely spaced to lens unit G2 so as to converge the axial rays within the clear aperture of lens unit G2 and therefore reduce the diameter thereof and corrector lens unit CR.

It will be noted that in all of the lenses of FIGS. 8–10, the corrector lens unit CR has strong curvatures toward the object side adjacent the clear apertures thereof. These strong curvatures permit greater aspheric correction above the height H. With this strong curvature of the corrector lens unit CR adjacent the clear apertures thereof, the residual aberrations of sagittal oblique spherical, coma and astigmatism may be more easily corrected.

The element L1 has been described as an element of overall meniscus shape. This is true even though the element may be biconvex at the axis, as exemplified in Table XI. The aspheric surfaces may lead to an overall meniscus, even though the axial radii specify another shape. The same is true for the corrector lens units CR.

In all cases, the corrector lens units CR are shaped to contribute to correction of spherical aberration in the center and to contribute to correction of off-axis aberrations toward the ends. These off-axis aberrations are sagittal oblique spherical, coma and astigmatism.

In the following tables, the lens elements are identified from the image end to the object end by the reference L followed successively by an arabic numeral. Lens surfaces are identified by the reference S followed by an arabic numeral successively from the image to the object end. The index of refraction of each lens element is given under the heading $N_D$. The dispersion of each lens element as measured by its Abbe number is given by $V_D$. EFL is the equivalent focal length of the lens and the semi-field angle is set forth. F/No. is the relative aperture of the lens, and the aperture stop is indicated in relation to a surface. The aspheric surfaces of the lens elements are in accordance with the coefficients set forth in the foregoing aspheric equation.

In the lenses of Tables I, II, IV, and IX–XI, the optical power of the coupling medium and CRT screen are not set forth since these powers are on the order of ten to the minus fourteenth power. However, it will be noted that in the lens of Tables III, IV, V, VII and VIII, the interior surface of the phosphor CRT screen is convex, resulting in the contribution of optical power. Accordingly, in Tables III, IV, V, VII and VIII, the optical power of the CRT is included in the lens prescription.

TABLE I

| Lens | Surface | Surface Radii (mm) | Axial Distance Between Surfaces (mm) | $N_D$ | $V_D$ |
|---|---|---|---|---|---|
| L1 | S1 | 83.645 | | | |
|  |  |  | 6.200 | 1.492 | 57.1 |
|  | S2 | 313.189 | | | |
|  |  |  | 21.698 | | |
| L2 | S3 | −95.418 | | | |
|  |  |  | 6.000 | 1.492 | 57.1 |
|  | S4 | −85.851 | | | |
|  |  |  | 0.500 | | |
| L3 | S5 | 94.246 | | | |
|  |  |  | 22.500 | 1.517 | 64.2 |
|  | S6 | −66.661 | | | |

TABLE I-continued

| | | 44.437 | | |
|---|---|---|---|---|
| | S7 | −34.347 | | |
| L4 | | | 2.000 | 1.492 57.1 |
| | S8 | PLANO | | | f/No. = 1:1.0 at infinity
EFL = 67.9 mm
FVD = 116.5 mm
Semi-Field Angle = 29.4°
Aperture Stop = 18.0 mm after surface 2
Aspheric Surfaces = S1, S3, S4, S7

| | S1 | S3 | S4 | S7 |
|---|---|---|---|---|
| D | $-0.1306 \times 10^{-5}$ | $0.2570 \times 10^{-7}$ | $0.5337 \times 10^{-6}$ | $-0.8391 \times 10^{-5}$ |
| E | $-0.1032 \times 10^{-8}$ | $-0.1528 \times 10^{-9}$ | $-0.2943 \times 10^{-9}$ | $0.2263 \times 10^{-7}$ |
| F | $0.4428 \times 10^{-12}$ | $0.1220 \times 10^{-13}$ | $0.5879 \times 10^{-12}$ | $-0.2779 \times 10^{-10}$ |
| G | $-0.5432 \times 10^{-15}$ | $-0.3139 \times 10^{-15}$ | $-0.5148 \times 10^{-15}$ | $0.1374 \times 10^{-13}$ |
| H | $0.4663 \times 10^{-18}$ | $-0.4321 \times 10^{-19}$ | $0.7578 \times 10^{-19}$ | $0.2312 \times 10^{-17}$ |
| I | $-0.1984 \times 10^{-21}$ | $0.2879 \times 10^{-21}$ | $0.2282 \times 10^{-21}$ | $-0.1497 \times 10^{-20}$ |
| K | 1.326 | 0.01 | 0.01 | 0.01 |

TABLE II

| Lens | Surface | Surface Radii (mm) | Axial Distance Between Surfaces (mm) | $N_D$ | $V_D$ |
|---|---|---|---|---|---|
| L1 | S1 | 101.387 | | | |
| | S2 | 176.364 | 12.640 | 1.492 | 57.1 |
| | | | 35.270 | | |
| L2 | S3 | 92.755 | | | |
| | S4 | −182.539 | 23.600 | 1.589 | 61.3 |
| | | | 30.110 | | |
| L3 | S5 | 669.240 | | | |
| | S6 | 1279.583 | 10.600 | 1.492 | 57.1 |
| | | | 33.232 | | |
| L4 | S7 | −46.976 | | | |
| | S8 | −72.000 | 6.000 | 1.492 | 57.1 |
| C | | | 5.000 | 1.439 | 55.0 |
| | S9 | PLANO | | | | f/No. = 1:1.0 at infinity
EFL = 98.0 mm
FVD = 168.0 mm
Semi-Field Angle = 30.9°
Aperture Stop = 32.8 mm after surface 2
Aspheric Surfaces = S1, S2, S5, S6, S7

| | S1 | S2 | S5 |
|---|---|---|---|
| D | $-0.8415 \times 10^{-6}$ | $-0.6444 \times 10^{-6}$ | $-0.6034 \times 10^{-6}$ |
| E | $-0.3459 \times 10^{-9}$ | $-0.2767 \times 10^{-9}$ | $-0.5180 \times 10^{-0}$ |
| F | $-0.1754 \times 10^{-13}$ | $-0.1466 \times 10^{-13}$ | $-0.1675 \times 10^{-12}$ |
| G | $0.9931 \times 10^{-17}$ | $0.2113 \times 10^{-16}$ | $0.1545 \times 10^{-15}$ |
| H | $0.2677 \times 10^{-20}$ | $0.1639 \times 10^{-12}$ | $0.4823 \times 10^{-19}$ |
| I | $0.8838 \times 10^{-25}$ | $-0.3375 \times 10^{-24}$ | $-0.2839 \times 10^{-22}$ |

| | S6 | S7 |
|---|---|---|
| D | $-0.1786 \times 10^{-7}$ | $-0.8718 \times 10^{-6}$ |
| E | $-0.3985 \times 10^{-9}$ | $0.5821 \times 10^{-9}$ |
| F | $-0.8618 \times 10^{-13}$ | $-0.9587 \times 10^{-13}$ |
| G | $0.7902 \times 10^{-16}$ | $-0.7466 \times 10^{-16}$ |
| H | $0.4447 \times 10^{-19}$ | $0.8381 \times 10^{-21}$ |
| I | $-0.1152 \times 10^{-22}$ | $0.2365 \times 10^{-22}$ |
| K | | −0.20 |

TABLE III

| Lens | Surface | Surface Radii (mm) | Axial Distance Between Surfaces (mm) | $N_D$ | $V_D$ |
|---|---|---|---|---|---|
| L1 | S1 | 66.258 | | | |
| | S2 | 87.397 | 7.000 | 1.492 | 57.1 |
| | | | 17.309 | | |
| L2 | S3 | 81.030 | | | |
| | S4 | −93.225 | 17.750 | 1.589 | 61.3 |
| | | | 25.336 | | |
| L3 | S5 | −333.243 | | | |
| | S6 | −89.717 | 8.000 | 1.492 | 57.1 |
| | | | 21.559 | | |
| L4 | S7 | −38.754 | | | |
| | S8 | −42.000 | 3.000 | 1.492 | 57.1 |
| C | | | 1.940 | 1.439 | 50.0 |
| | S9 | PLANO | | | |
| CS | S10 | −500.000 | 12.700 | 1.540 | 50.0 | f/No. = 1:1.0 at infinity
EFL = 68.2 mm
FVD = 114.6 mm
Semi-Field Angle = 38.0°
Aperture Stop = 3.55 mm after surface 3
Aspheric Surfaces = S1, S2, S5, S6, S10

| | S1 | S2 | S5 |
|---|---|---|---|
| D | $-0.2278 \times 10^{-5}$ | $-0.1060 \times 10^{-5}$ | $0.8704 \times 10^{-6}$ |
| E | $-0.2437 \times 10^{-8}$ | $-0.2003 \times 10^{-8}$ | $-0.3163 \times 10^{-8}$ |
| F | $-0.3189 \times 10^{-12}$ | $-0.1900 \times 10^{-12}$ | $0.6699 \times 10^{-12}$ |
| G | $0.4675 \times 10^{-15}$ | $0.6560 \times 10^{-15}$ | $0.6784 \times 10^{-15}$ |
| H | $0.4145 \times 10^{-18}$ | $0.3323 \times 10^{-18}$ | $0.3451 \times 10^{-18}$ |
| I | $-0.2057 \times 10^{-21}$ | $-0.1829 \times 10^{-21}$ | $-0.3479 \times 10^{-21}$ |

| | S6 | S10 |
|---|---|---|
| D | $0.2129 \times 10^{-5}$ | $-0.1233 \times 10^{-5}$ |
| E | $-0.1180 \times 10^{-8}$ | $0.5939 \times 10^{-9}$ |
| F | $-0.1835 \times 10^{-11}$ | $-0.9726 \times 10^{-13}$ |
| G | $0.1491 \times 10^{-14}$ | $0.4616 \times 10^{-17}$ |
| H | $0.9406 \times 10^{-18}$ | $0.0000 \times 10^{+00}$ |
| I | $-0.6336 \times 10^{-21}$ | $0.000 \times 10^{+00}$ |

TABLE IV

| Lens | Surface | Surface Radii (mm) | Axial Distance Between Surfaces (mm) | $N_D$ | $V_D$ |
|---|---|---|---|---|---|
| L1 | S1 | 79.276 | | | |
| | S2 | 125.026 | 13.465 | 1.492 | 57.1 |
| | | | 22.087 | | |
| L2 | S3 | 81.775 | | | |
| | S4 | −126.463 | 25.000 | 1.589 | 61.3 |
| | | | 25.783 | | |
| L3 | S5 | 467.166 | | | |
| | S6 | −2558.016 | 13.465 | 1.492 | 57.1 |
| | | | 17.454 | | |
| L4 | S7 | −45.357 | | | |
| | S8 | −52.168 | 5.000 | 1.527 | 50.0 |
| C | | | 5.000 | 1.412 | 50.0 |
| | S9 | PLANO | | | |
| CS | S10 | −350.000 | 12.500 | 1.527 | 50.0 | f/No. = 1:1.0 at infinity
EFL = 84.1 mm
FVD = 139.8 mm
Semi-Field Angle = 33.45°
Aperture Stop = 17.67 mm after surface 2
Aspheric Surfaces = S1, S2, S5 and S6

| | S1 | S2 | S5 |
|---|---|---|---|
| D | $-0.4124 \times 10^{-6}$ | $-0.4063 \times 10^{-6}$ | $-0.4124 \times 10^{-6}$ |
| E | $-0.5143 \times 10^{-9}$ | $-0.3033 \times 10^{-9}$ | $-0.8874 \times 10^{-9}$ |
| F | $-0.3976 \times 10^{-13}$ | $-0.7744 \times 10^{-13}$ | $-0.3866 \times 10^{-13}$ |
| G | $0.5977 \times 10^{-17}$ | $0.3201 \times 10^{-16}$ | $-0.2865 \times 10^{-16}$ |
| H | $0.1810 \times 10^{-20}$ | $0.2429 \times 10^{-19}$ | $-0.4795 \times 10^{-19}$ |
| I | $0.4611 \times 10^{-23}$ | $-0.1867 \times 10^{-23}$ | $0.2993 \times 10^{-22}$ |
| K | | | 0.01 |
| S6 | | | |

TABLE IV-continued

| | |
|---|---|
| D | $0.7519 \times 10^{-6}$ |
| E | $-0.3497 \times 10^{-9}$ |
| F | $-0.2265 \times 10^{-12}$ |
| G | $0.2412 \times 10^{-17}$ |
| H | $0.7701 \times 10^{-19}$ |
| I | $-0.1523 \times 10^{-22}$ |
| K | 0.01 |

TABLE V

| Lens | | Surface Radii(mm) | Axial Distance Between Surfaces(mm) | $N_D$ | $V_D$ |
|---|---|---|---|---|---|
| L1 | S1 | 59.231 | | | |
| | | | 9.000 | 1.492 | 57.1 |
| | S2 | 82.012 | | | |
| | | | 22.198 | | |
| | S3 | 69.470 | | | |
| L2 | | | 25.000 | 1.517 | 64.2 |
| | S4 | $-119.732$ | | | |
| | | | 13.510 | | |
| | S5 | $-106.983$ | | | |
| L3 | | | 8.000 | 1.492 | 57.1 |
| | S6 | $-82.691$ | | | |
| | | | 33.514 | | |
| | S7 | $-43.339$ | | | |
| L4 | | | 5.000 | 1.527 | 50.0 |
| | S8 | $-49.700$ | | | |
| C | | | 5.000 | 1.412 | 50.0 |
| | S9 | PLANO | | | |
| CS | | | 12.500 | 1.527 | 50.0 |
| | S10 | $-350.000$ | | | | f/No. = 1:1.0 at infinity
EFL = 84.3 mm
FVD = 133.7 mm
Semi-Field Angle = 33.4°
Aperture Stop = 17.76 mm after surface 2

Aspheric Surfaces S1, S2, S5 and S6

| | S1 | S2 | S5 |
|---|---|---|---|
| D | $-0.5012 \times 10^{-6}$ | $0.2450 \times 10^{-6}$ | $0.5275 \times 10^{-6}$ |
| E | $-0.2904 \times 10^{-10}$ | $0.3880 \times 10^{-9}$ | $0.1558 \times 10^{-8}$ |
| F | $-0.4217 \times 10^{-12}$ | $-0.6627 \times 10^{-12}$ | $-0.6502 \times 10^{-13}$ |
| G | $-0.1305 \times 10^{-15}$ | $-0.9977 \times 10^{-16}$ | $-0.2145 \times 10^{-15}$ |
| H | $0.1782 \times 10^{-19}$ | $0.8908 \times 10^{-19}$ | $-0.1005 \times 10^{-18}$ |
| I | $0.2575 \times 10^{-22}$ | $0.1446 \times 10^{-22}$ | $0.3510 \times 10^{-22}$ |
| K | | | 0.01 |

| | S6 |
|---|---|
| D | $0.1726 \times 10^{-5}$ |
| E | $0.1716 \times 10^{-8}$ |
| F | $0.1073 \times 10^{-12}$ |
| G | $-0.8155 \times 10^{-16}$ |
| H | $-0.6784 \times 10^{-19}$ |
| I | $0.8617 \times 10^{-23}$ |

TABLE VI

| Lens | | Surface Radii(mm) | Axial Distance Between Surfaces(mm) | $N_D$ | $V_D$ |
|---|---|---|---|---|---|
| L1 | S1 | 89.286 | | | |
| | | | 13.465 | 1.492 | 57.1 |
| | S2 | 128.606 | | | |
| | | | 42.130 | | |
| | S3 | 79.674 | | | |
| L2 | | | 25.000 | 1.589 | 61.3 |
| | S4 | $-196.859$ | | | |
| | | | 0.129 | | |
| | S5 | 140.851 | | | |
| L3 | | | 9.618 | 1.492 | 57.1 |
| | S6 | 102.345 | | | |
| | | | 17.426 | | |
| | S7 | 2062.610 | | | |
| L4 | | | 13.465 | 1.492 | 57.1 |
| | S8 | $-591.273$ | | | |
| | | | 34.784 | | |
| | S9 | $-45.510$ | | | |
| L5 | | | 6.000 | 1.527 | 50.0 |
| | S10 | $-52.168$ | | | |
| C | | | 7.000 | 1.412 | 50.0 |
| | S11 | PLANO | | | | f/No. = 1:1.0 at infinity
EFL = 98.8 mm
FVD = 176.0 mm
Semi-Field Angle = 31.6°
Aperture Stop = 33.70 mm after surface 2

Aspheric Surfaces = S1, S2, S5, S6, S7, S8

| | S1 | S2 | S5 |
|---|---|---|---|
| D | $-0.4429 \times 10^{-6}$ | $-0.1855 \times 10^{-6}$ | $0.4228 \times 10^{-7}$ |
| E | $-0.2200 \times 10^{-9}$ | $-0.2640 \times 10^{-9}$ | $-0.3414 \times 10^{-9}$ |
| F | $-0.3848 \times 10^{-13}$ | $-0.1504 \times 10^{-13}$ | $0.3820 \times 10^{-13}$ |
| G | $0.4231 \times 10^{-17}$ | $0.1099 \times 10^{-16}$ | $0.2441 \times 10^{-16}$ |
| H | $0.1711 \times 10^{-20}$ | $0.8605 \times 10^{-21}$ | $-0.2225 \times 10^{-21}$ |
| I | $0.9494 \times 10^{-25}$ | $0.5953 \times 10^{-26}$ | $-0.5386 \times 10^{-23}$ |
| K | | | $-1.00$ |

| | S6 | S7 | S8 |
|---|---|---|---|
| D | $0.2867 \times 10^{-6}$ | $-0.2380 \times 10^{-6}$ | $0.6554 \times 10^{-7}$ |
| E | $-0.2947 \times 10^{-9}$ | $-0.4064 \times 10^{-9}$ | $-0.1887 \times 10^{-9}$ |
| F | $-0.6147 \times 10^{-14}$ | $-0.1984 \times 10^{-12}$ | $-0.2269 \times 10^{-12}$ |
| G | $0.3124 \times 10^{-16}$ | $0.8141 \times 10^{-16}$ | $0.3254 \times 10^{-16}$ |
| H | $0.8326 \times 10^{-20}$ | $0.4930 \times 10^{-19}$ | $0.5569 \times 10^{-19}$ |
| I | $-0.3545 \times 10^{-23}$ | $-0.1849 \times 10^{-23}$ | $-0.9428 \times 10^{-23}$ |
| K | | | 0.01 |

TABLE VII

| Lens | | Surface Radii(mm) | Axial Distance Between Surfaces(mm) | $N_D$ | $V_D$ |
|---|---|---|---|---|---|
| L1 | S1 | 52.933 | | | |
| | | | 7.700 | 1.492 | 57.1 |
| | S2 | 98.140 | | | |
| | | | 5.569 | | |
| | S3 | $-65.901$ | | | |
| L2 | | | 5.500 | 1.492 | 57.1 |
| | S4 | $-113.517$ | | | |
| | | | 0.098 | | |
| | S5 | 54.790 | | | |
| L3 | | | 7.000 | 1.589 | 61.3 |
| | S6 | 123.758 | | | |
| | | | 0.880 | | |
| | S7 | 95.292 | | | |
| L4 | | | 11.000 | 1.589 | 61.3 |
| | S8 | $-99.491$ | | | |
| | | | 14.405 | | |
| | S9 | $-97.613$ | | | |
| L5 | | | 7.700 | 1.492 | 57.1 |
| | S10 | $-50.253$ | | | |
| | | | 18.735 | | |
| | S11 | $-29.649$ | | | |
| L6 | | | 6.000 | 1.527 | 50.0 |
| | S12 | $-38.521$ | | | |
| C | | | 5.000 | 1.412 | 50.0 |
| | S13 | $-350.000$ | | | |
| CS | | | 6.000 | 1.527 | 560.0 |
| | S14 | $-350.000$ | | | | f/No. = 1:1.0 at infinity
EFL = 56.4 mm
FVD = 109.7 mm
Semi-Field Angle = 44°
Aperture Stop = 1.40 mm after surface 5
Aspheric Surfaces = S1, S2, S3, S4, S9 and S10

| | S1 | S2 | S3 |
|---|---|---|---|
| D | $-0.3695 \times 10^{-5}$ | $-0.4269 \times 10^{-5}$ | $0.386? \times 10^{-5}$ |
| E | $-0.5293 \times 10^{-8}$ | $-0.4995 \times 10^{-8}$ | $0.9202 \times 10^{-11}$ |
| F | $-0.2771 \times 10^{-11}$ | $0.1199 \times 10^{-11}$ | $0.9401 \times 10^{-13}$ |
| G | $0.1523 \times 10^{-14}$ | $0.2761 \times 10^{-14}$ | $-0.8897 \times 10^{-16}$ |
| H | $0.1983 \times 10^{-17}$ | $0.5775 \times 10^{-18}$ | $-0.1929 \times 10^{-18}$ |
| I | $-0.2673 \times 10^{-21}$ | $-0.1528 \times 10^{-20}$ | $-0.5911 \times 10^{-21}$ |

| | S4 | S9 | S10 |
|---|---|---|---|
| D | $0.4943 \times 10^{-5}$ | $-0.2987 \times 10^{-5}$ | $0.1387 \times 10^{-5}$ |
| E | $0.1064 \times 10^{-8}$ | $0.9284 \times 10^{-9}$ | $-0.1133 \times 10^{-8}$ |
| F | $-0.2424 \times 10^{-11}$ | $-0.1053 \times 10^{-10}$ | $0.1706 \times 10^{-11}$ |
| G | $-0.1442 \times 10^{-14}$ | $0.1014 \times 10^{-13}$ | $0.2638 \times 10^{-14}$ |
| H | $0.1528 \times 10^{-17}$ | $0.2234 \times 10^{-16}$ | $0.2175 \times 10^{-17}$ |

TABLE VII-continued

| | | | |
|---|---|---|---|
| I | $0.2049 \times 10^{-21}$ | $-0.2144 \times 10^{-19}$ | $0.6418 \times 10^{-21}$ |
| K | $-1.00$ | | $0.01$ |

TABLE VIII

| Lens | Surface | Radii(mm) | Axial Distance Between Surfaces(mm) | $N_D$ | $V_D$ |
|---|---|---|---|---|---|
| L1 | S1 | 378.348 | | | |
| | | | 6.780 | 1.492 | 57.1 |
| | S2 | 1917.850 | | | |
| | | | 20.844 | | |
| L2 | S3 | 93.352 | | | |
| | | | 20.000 | 1.589 | 61.3 |
| | S4 | $-82.485$ | | | |
| | | | 20.866 | | |
| L3 | S5 | $-170.505$ | | | |
| | | | 7.630 | 1.492 | 57.1 |
| | S6 | $-69.0192$ | | | |
| | | | 30.164 | | |
| L4 | S7 | $-38.787$ | | | |
| | | | 3.000 | 1.492 | 57.1 |
| | S8 | $-42.000$ | | | |
| C | | | 1.940 | 1.439 | 50.0 |
| | S9 | PLANO | | | |
| CS | | | 12.700 | 1.540 | 50.0 |
| | S10 | $-500.000$ | | | | f/No. = 1:1.0 at infinity
EFL = 67.9 mm
FVD = 123.9 mm
Semi-Field Angle = 38.01°
Aperture Stop = 14.00 mm after surface 3
Aspheric Surfaces = S1, S2, S5, S6, S10

| | S1 | S2 | S5 |
|---|---|---|---|
| D | $-0.8234 \times 10^{-6}$ | $0.5870 \times 10^{-6}$ | $0.3655 \times 10^{-6}$ |
| E | $0.8469 \times 10^{-9}$ | $0.2435 \times 10^{-8}$ | $0.3202 \times 10^{-8}$ |
| F | $0.1505 \times 10^{-11}$ | $0.4743 \times 10^{-12}$ | $-0.3679 \times 10^{-12}$ |
| G | $-0.1462 \times 10^{-14}$ | $-0.9536 \times 10^{-15}$ | $0.8428 \times 10^{-15}$ |
| H | $0.3394 \times 10^{-18}$ | $0.8105 \times 10^{-18}$ | $-0.8797 \times 10^{-18}$ |
| I | $-0.2195 \times 10^{-22}$ | $-0.3558 \times 10^{-21}$ | $0.3881 \times 10^{-21}$ |
| K | | | $-1.00$ |

| | S6 | S10 |
|---|---|---|
| D | $0.1848 \times 10^{-5}$ | $-0.1233 \times 10^{-5}$ |
| E | $0.4485 \times 10^{-9}$ | $0.5939 \times 10^{-9}$ |
| F | $0.4061 \times 10^{-11}$ | $-0.9726 \times 10^{-13}$ |
| G | $-0.1669 \times 10^{-14}$ | $0.4616 \times 10^{-17}$ |
| H | $-0.7375 \times 10^{-18}$ | $0.0000^{+00}$ |
| I | $0.7896 \times 10^{-21}$ | $0.0000^{+00}$ |
| K | $-1.00$ | |

TABLE IX

| Lens | Surface | Radii(mm) | Axial Distance Between Surfaces(mm) | $N_D$ | $V_D$ |
|---|---|---|---|---|---|
| L1 | S1 | $-671.234$ | | | |
| | | | 8.000 | 1.492 | 57.1 |
| | S2 | $-207.481$ | | | |
| | | | 32.506 | | |
| L2 | S3 | 73.416 | | | |
| | | | 20.000 | 1.527 | 560.0 |
| | S4 | $-205.356$ | | | |
| | | | 10.320 | | |
| L3 | S5 | 497.492 | | | |
| | | | 9.000 | 1.492 | 57.1 |
| | S6 | $-184.865$ | | | |
| | | | 48.788 | | |
| L4 | S7 | $-39.698$ | | | |
| | | | 3.500 | 1.586 | 34.0 |
| | S8 | $-42.000$ | | | |
| C | | | 7.000 | 1.432 | 50.0 |
| | S9 | PLANO | | | | f/No. = 1:1.0 at infinity
EFL = 78.0 mm
FVD = 147.7 mm
Semi-Field Angle = 33.2°
Aperture Stop = 30.23 mm after surface 2
Aspheric Surfaces = S1, S2, S5, S6, S7

TABLE IX-continued

| | S1 | S2 | S5 |
|---|---|---|---|
| D | $-0.2150 \times 10^{-5}$ | $-0.1471 \times 10^{-5}$ | $0.1369 \times 10^{-5}$ |
| E | $0.2969 \times 10^{-9}$ | $0.6231 \times 10^{-9}$ | $0.4434 \times 10^{-9}$ |
| F | $0.4509 \times 10^{-12}$ | $0.3104 \times 10^{-13}$ | $0.4550 \times 10^{-12}$ |
| G | $-0.2485 \times 10^{-15}$ | $0.1427 \times 10^{-15}$ | $0.8954 \times 10^{-16}$ |
| H | $0.1182 \times 10^{-18}$ | $-0.7749 \times 10^{-19}$ | $-0.1127 \times 10^{-18}$ |
| I | $-0.2974 \times 10^{-22}$ | $0.1150 \times 10^{-22}$ | $0.5257 \times 10^{-22}$ |
| K | | | $-1.00$ |

| | S6 | S7 |
|---|---|---|
| D | $0.1816 \times 10^{-5}$ | $-0.7748 \times 10^{-5}$ |
| E | $0.9665 \times 10^{-9}$ | $0.1315 \times 10^{-7}$ |
| F | $0.6075 \times 10^{-13}$ | $-0.1146 \times 10^{-10}$ |
| G | $0.2914 \times 10^{-15}$ | $0.6217 \times 10^{-14}$ |
| H | $0.1631 \times 10^{-19}$ | $0.2791 \times 10^{-17}$ |
| I | $0.1263 \times 10^{-22}$ | $0.8710 \times 10^{-21}$ |
| K | $-1.00$ | $0.01$ |

TABLE X

| Lens | Surface | Radii(mm) | Axial Distance Between Surfaces(mm) | $N_D$ | $V_D$ |
|---|---|---|---|---|---|
| L1 | S1 | $-315.328$ | | | |
| | | | 8.000 | 1.492 | 57.1 |
| | S2 | $-169.809$ | | | |
| | | | 35.138 | | |
| L2 | S3 | 70.326 | | | |
| | | | 19.500 | 1.527 | 50.0 |
| | S4 | $-270.522$ | | | |
| | | | 12.912 | | |
| L3 | S5 | 236.802 | | | |
| | | | 9.000 | 1.492 | 57.1 |
| | S6 | $-232.758$ | | | |
| | | | 47.919 | | |
| L4 | S7 | $-39.507$ | | | |
| | | | 3.500 | 1.586 | 34.0 |
| | S8 | $-42.000$ | | | |
| C | | | 7.000 | 1.417 | 50.0 |
| | S9 | PLANO | | | | f/No. = 1:1.0 at infinity
EFL = 78.18 mm
FVD = 151.57 mm
Semi-Field Angle = 33.3°
Aperture Stop = 0.00 mm after surface 3
Aspheric Surfaces = S1, S2, S5, S6, S7

| | S1 | S2 | S5 |
|---|---|---|---|
| D | $-0.1877 \times 10^{-5}$ | $-0.1237 \times 10^{-5}$ | $0.1231 \times 10^{-5}$ |
| E | $0.4169 \times 10^{-9}$ | $0.7071 \times 10^{-9}$ | $0.6586 \times 10^{-9}$ |
| F | $0.4372 \times 10^{-12}$ | $-0.2489 \times 10^{-14}$ | $0.4893 \times 10^{-12}$ |
| G | $-0.2819 \times 10^{-15}$ | $0.1034 \times 10^{-15}$ | $0.1141 \times 10^{-16}$ |
| H | $0.9486 \times 10^{-19}$ | $-0.7923 \times 10^{-19}$ | $-0.1471 \times 10^{-18}$ |
| I | $-0.1511 \times 10^{-22}$ | $0.1838 \times 10^{-22}$ | $0.1252 \times 10^{-21}$ |
| K | | | $-1.00$ |

| | S6 | S7 |
|---|---|---|
| D | $0.1683 \times 10^{-5}$ | $-0.7644 \times 10^{-5}$ |
| E | $0.1407 \times 10^{-8}$ | $0.1287 \times 10^{-7}$ |
| F | $-0.1152 \times 10^{-13}$ | $-0.1152 \times 10^{-10}$ |
| G | $0.1236 \times 10^{-15}$ | $0.6381 \times 10^{-14}$ |
| H | $0.4008 \times 10^{-19}$ | $-0.2734 \times 10^{-17}$ |
| I | $0.1138 \times 10^{-21}$ | $0.7962 \times 10^{-21}$ |
| K | $-1.00$ | $0.01$ |

TABLE XI

| Lens | Surface | Radii (mm) | Axial Distance between Surfaces (mm) | $N_D$ | $V_D$ |
|---|---|---|---|---|---|
| L1 | S1 | 276.954 | | | |
| | | | 8.000 | 1.492 | 57.1 |
| | S2 | $-713.989$ | | | |
| | | | 39.544 | | |
| L2 | S3 | 64.059 | | | |
| | | | 21.000 | 1.527 | 560.0 |
| | S4 | $-345.419$ | | | |
| | | | 8.542 | | |
| L3 | S5 | 281.339 | | | |
| | | | 9.000 | 1.492 | 57.1 |
| | S6 | $-243.160$ | | | |
| | | | 41.801 | | |
| | S7 | $-38.694$ | | | |

TABLE XI-continued

| L4 | | | 5.000 | 1.586 | 34.0 |
|---|---|---|---|---|---|
| | S8 | −46.000 | | | |
| C | | | 7.000 | 1.460 | 50.0 |
| | S9 | PLANO | | | | f/No. = 1:1.0 at infinity  
EFL = 77.89 mm  
FVD = 151.6 mm  
Semi-Field Angle = 33.0°  
Aperture Stop = 36.78 mm after surface 2  
Aspheric Surfaces = S1, S2, S5, S6, S7

| | S1 | S2 | S5 |
|---|---|---|---|
| D | $-0.1863 \times 10^{-5}$ | $-0.1562 \times 10^{-5}$ | $0.9945 \times 10^{-6}$ |
| E | $-0.2210 \times 10^{-9}$ | $0.3054 \times 10^{-9}$ | $0.8919 \times 10^{-9}$ |
| F | $0.3575 \times 10^{-12}$ | $-0.1572 \times 10^{-12}$ | $0.2028 \times 10^{-12}$ |
| G | $-0.2164 \times 10^{-15}$ | $0.1507 \times 10^{-15}$ | $0.5708 \times 10^{-16}$ |
| H | $0.1158 \times 10^{-18}$ | $-0.3256 \times 10^{-19}$ | $0.1910 \times 10^{-19}$ |
| I | $-0.2149 \times 10^{-22}$ | $0.3603 \times 10^{-22}$ | $0.1193 \times 10^{-23}$ |
| K | | | $-1.00$ |

| | S6 | S7 |
|---|---|---|
| D | $0.1660 \times 10^{-5}$ | $-0.5606 \times 10^{-5}$ |
| E | $0.1445 \times 10^{-8}$ | $0.9556 \times 10^{-8}$ |
| F | $0.7721 \times 10^{-13}$ | $-0.9504 \times 10^{-11}$ |
| G | $0.7461 \times 10^{-16}$ | $0.6372 \times 10^{-14}$ |
| H | $0.1131 \times 10^{-18}$ | $-0.2957 \times 10^{-17}$ |
| I | $0.5590 \times 10^{-22}$ | $0.8632 \times 10^{-21}$ |
| K | $-1.00$ | $0.01$ |

Table XII sets forth the ratio of the powers $K_1$, $K_2$, $K_3$ and $K_{CR}$ of each of lens units G1, G2, G3, and corrector lens unit to the power $K_0$ of the overall lens.

TABLE XII

| Lens | $K_1/K_0$ | $K_2/K_0$ | $|K_3/K_0|$ | $K_{CR}/K_0$ |
|---|---|---|---|---|
| TABLE I | .331 | .859 | .976 | — |
| TABLE II | .214 | .912 | .953 | .035 |
| TABLE III | .136 | .895 | .694 | .277 |
| TABLE IV | .210 | .956 | .639 | .104 |
| TABLE V | .219 | .945 | .672 | .126 |
| TABLE VI | .186 | .996 | .917 | −.013 |
| TABLE VII | .094 | .973 | .744 | .283 |
| TABLE VIII | .071 | .878 | .690 | .296 |
| TABLE IX | .129 | .743 | .830 | .284 |
| TABLE X | .167 | .725 | .809 | .326 |
| TABLE XI | .192 | .748 | .920 | .293 |

In Tables I and VII, elements L1 and L2 are considered to comprise the first lens unit G1. In Table VI, elements L3 and L4 are considered as a corrector lens unit. However, element L4 must be within the preferred range of axial spacing from L2 to achieve the desired results.

It will be noted from Table XII that the power $K_3$ of the third lens unit G3 may be decreased when the phosphor surface of the CRT faceplate CS is convex. Note $K_3/K_0$ in Tables I, II, VI and IX-XI where the phosphor side of CS is plano.

It will be noted that the axial power $K_{CR}$ of the corrector lens unit C is quite small in relation to the overall power $K_0$ of the lens or in relation to the power $K_2$ of the second lens unit G2. The axial power $K_1$ of group G1 is very small in all cases. Therefore, the effect of temperature on lens units G1 and CR will have little effect on the focus of the lens.

The power ratio of the first lens group is preferably $$K_1/K_0 < 0.4$$

and the power ratio of the corrector lens unit is preferably $$K_{CR}/K_0 < 0.04$$

Table XIII sets forth the absolute ratios of the power of the first lens element L1 at the clear aperture to the power of the element at the optical axis A; the ratio of the spacing $D_{12}$ to the equivalent focal length $F_0$ of the lens; and the axial spacing of the corrector lens unit CR from lens unit G2. The inclusion of the corrector elements L2 and L3 in FIGS. 1 and 6, respectively, does not alter the preferred spacing ranges $D_{12}$ and $D_{2C}$.

TABLE XIII

| Lens | $|D_{12}/F_3|$ | $D_{12}/F_0$ | $D_{2C}/F_0$ | $|Ky_{CA}/Ky_A|$ | Unit CR 2H/CA |
|---|---|---|---|---|---|
| TABLE I | .403 | .415 | — | 4.61 | — |
| TABLE II | .343 | .36 | .307 | .88 | .65 |
| TABLE III | .176 | .254 | .371 | 10.37 | .55 |
| TABLE IV | .168 | .262 | .307 | 5.12 | .53 |
| TABLE V | .178 | .265 | .161 | 10.17 | .89 |
| TABLE VI | .391 | .426 | .273 | 7.09 | .69 |
| TABLE VII | .147 | .198 | .255 | 3.42 | .69 |
| TABLE VIII | .211 | .306 | .308 | 15.6 | .78 |
| TABLE IX | .346 | .417 | .132 | 5.46 | .89 |
| TABLE X | .364 | .449 | .165 | 8.85 | .90 |
| TABLE XI | .467 | .508 | .109 | 2.63 | .83 |

In the lenses shown in FIGS. 9 and 10 and Tables IX, X and XI, the element L1 is an overall meniscus convex to the power unit G2, and the corrector lens unit CR is also convex to unit G2. The shape of one or both of L1 and CR contribute to correction of sagittal oblique spherical aberration.

It will be noted in the embodiments of FIG. 1, Table I and FIG. 6, Table VI, the elements L2 and L3, respectively, have been provided with surfaces convex to the power unit G2 to contribute to correction of this aberration. Also, in the lens of FIG. 7, Table VII, the element L2 is provided for the same purpose.

The embodiments of FIGS. 3, 4 and 5, while having semi-field angles on the order of 33.4° do not require this additional element for contribution to correction of field curvature since these lenses are designed for use with CRT faceplates CS having convex phosphor side surfaces which decreases the negative optical power requirement of lens unit G3. The same is true for the lens of FIG. 8, Table VIII, having a semi-field angle of 38°. This lens has a relatively small power ratio $K_3/K_0$ (Table XI) for lens unit G3 in view of the positive optical power of the CRT faceplate CS.

From the foregoing tables, it is seen that the power $K_2$ of lens unit G2 is always at least twice as great as the power $K_{CR}$ of the corrector lens unit CR, or $$K_2/K_{CR} > 2.0$$

From the foregoing prescription tables II–XI, it will be noted that both surfaces of corrector element CR are defined on radii at the optical axis which are substantially equal to or greater than the equivalent focal length of the lens. Only in Table V is a surface (S6) on a base radius less than the equivalent focal length of the lens (EFL=84.3 mm; S6=82.69 mm or S6/EFL=0.98).

The corrector lens unit CR may be considered to be part of lens unit G2 since in the disclosed embodiments it contributes a small amount of positive power even though the spacing is greater than shown in FIG. 2 of U.S. Pat. No. 4,348,081. In all embodiments, the convex element of lens unit G2 is formed of glass to avoid focus shift with temperature variation.

The spacing $D_{12}$ as a ratio to the equivalent focal length $F_3$ of the third lens unit should be $$0.5 > |D_{12}/F_3| > 0.1$$

for the reasons previously set forth.

The spacing $D_{2C}/F_0$ should be $$0.4 > D_{2C}/F_0 > 0.1$$

in order to achieve the preferred design freedom in correcting aberrations due to off-axis rays, and to adequately correct for aperture dependent aberrations.

The molded aspheric elements are so shaped that there is minimal variation in thickness across the diameter of that element. This contributes to greater accuracy in molding these elements.

Another important characteristic of the aspheric elements of lenses embodying the invention is shown in Table XIV where Tmin and Tmax are minimum and maximum thicknesses of the plastic elements, respectively, as the thickness changes parallel to the optical axis along the diameter of the element.

TABLE XIV

| Lens | L1 | L2 | L3 | L4 | L5 |
| --- | --- | --- | --- | --- | --- |
| TABLE I | 1.7 | 1.1 | — | — | — |
| TABLE II | 1.3 | — | 1.3 | 2.0 | — |
| TABLE III | 1.1 | — | 1.4 | 1.0 | — |
| TABLE IV | 1.1 | — | 1.2 | 1.0 | — |
| TABLE V | 1.3 | — | 1.1 | 1.0 | — |
| TABLE VI | 1.3 | — | 1.4 | 1.1 | 1.0 |
| TABLE VII | 1.6 | 1.6 | — | 1.3 | 1.0 |
| TABLE VIII | 1.6 | — | 1.7 | 1.0 | — |
| TABLE IX | 1.2 | — | 1.5 | 1.3 | — |
| TABLE X | 1.1 | — | 1.8 | 1.0 | — |
| TABLE XI | 1.5 | — | 1.5 | 1.4 | — |

Because of the low powers of the plastic elements having aspheric surfaces, it is possible to maintain the ratio $$T_{max}/T_{min} < 2.5$$

This means that these elements are very suitable for manufacturing, using conventional injection molding technology. This manufacturing technique can give excellent results and very low costs if lenses to be molded have as small a variation of thickness as possible. This is due to more uniform cooling of molded parts and smaller deformations caused by non-uniform shrinkage of the plastic lens as it is cooled.

While lenses embodying the invention have been disclosed in preferred forms where the first lens unit G1 is weakly positive, if the diameter of the second lens unit is not a major concern, the first lens unit may be of weak negative power and the corrector lens unit CR will still provide the functions described. Thus, the term "weak optical power" may refer to positive or negative optical power.

It may thus be seen that the objects of the invention set forth, as well as those made apparent from the foregoing description, are efficiently attained. While preferred embodiments of the invention have been set forth for purposes of disclosure, modifications to the disclosed embodiments of the invention, as well as other embodiments thereof, may occur to those skilled in the art. Accordingly, the appended claims are intended to cover all embodiments of the invention and modifications to the disclosed embodiments which do not depart from the spirit and scope of the invention.

Having thus disclosed the invention, what is claimed is:

1. A projection lens for use in combination with a cathode ray tube, which lens is positioned closely adjacent the faceplate of the cathode ray tube, said lens consisting of three lens units, the first lens unit from the image end including an overall meniscus shaped element of weak positive optical power at the optical axis of said lens and having at least one aspheric surface, a second lens unit comprising a biconvex element which supplies the majority of the positive optical power of said lens, a third lens unit closely adjacent said cathode ray tube and having a strongly concave image side surface and serving as a field flattener, said lens further comprising a corrector lens unit having at least one aspheric surface positioned between said second and third lens units, said first and second lens units being axially spaced $$0.5 > |D_{12}/F_3| > 0.1$$

where $D_{12}$ is the axial spacing between said first and second lens units and $F_3$ is the equivalent focal length of said third lens unit, said corrector lens unit being constructed, arranged and spaced from said second lens unit such that the axial marginal rays from said second lens unit as traced from the long conjugate intersect the image side surface of said corrector lens unit at a height H from the optical axis that is less than the clear aperture of the image side surface of said corrector lens unit but at a height which will not affect the contribution of said corrector lens unit for correction of aperture dependent aberrations, said surfaces of said corrector lens unit above the height H being configured beyond said height H to contribute to correction of aberrations due to off-axis rays.

2. The lens of claim 1 where said first lens unit consists of a single element which is of positive optical power at the optical axis and changes to negative optical power adjacent its clear aperture.

3. The lens of claim 2 where said first lens unit has two aspheric surfaces.

4. The lens of claim 1 where said corrector lens unit consists of a single element having two aspheric surfaces.

5. The lens of claim 4 where said corrector lens unit has surfaces which are defined at the optical axis on radii which are substantially equal to or greater than the equivalent focal length of said lens.

6. The lens of claim 1 where said corrector lens unit has surfaces which are defined at the optical axis on radii which are substantially equal to or greater than the equivalent focal length of said lens.

7. The lens of claim 1 where said first lens unit and said corrector lens unit each consist of single elements.

8. The lens of claim 7 where both of said first lens unit and said corrector lens unit have two aspheric surfaces.

9. The lens of claim 1 satisfying the condition $$0.92 \geq 2H/CA > 0.5$$

where CA is the clear aperture of the image side surface of said corrector lens unit.

10. The lens of claim 1 satisfying the condition $$0.4 > D_{2C}/F_0 > 0.1$$

where $D_{2C}$ is the axial distance between said second lens unit and said corrector lens unit and $F_0$ is the equivalent focal length of the lens.

11. The lens of claim 5 satisfying the condition $$0.4 > D_{2C}/F_0 > 0.1$$

where $D_{2C}$ is the axial distance between said second lens unit and said corrector lens unit and $F_0$ is the equivalent focal length of the lens.

12. The lens of claim 7 satisfying the condition $$0.4 > D_{2C}F_0 > 0.1$$

where $D_{2C}$ is the axial distance between said second lens unit and said corrector lens unit and $F_0$ is the equivalent focal length of the lens.

13. The lens of claim 8 satisfying the condition $$0.4 > D_{2C}/F_0 > 0.1$$

where $D_{2C}$ is the axial distance between said second lens unit and said corrector lens unit and $F_0$ is the equivalent focal length of the lens.

14. The projection lens of claim 1 further comprising another corrector lens unit consisting of a meniscus element having at least one aspheric surface positioned closely adjacent said secod lens unit and being convex toward said second lens unit.

15. The projection lens of claim 14 where said meniscus element of said another corrector lens unit is on the image side of said second lens unit and is part of said first lens unit.

16. The projection lens of claim 14 where said meniscus element of said another corrector lens unit is on the object side of said second lens unit.

17. The projection lens of claim 1 where said first lens unit is a single element and satisfies the condition $$|K_{CA}/K_A| > 0.8$$

where $K_{CA}$ is the optical power of said meniscus element of said first lens unit at the clear aperture thereof and $K_A$ is the optical power of said meniscus element of said first lens unit at the optical axis thereof.

18. The projection lens of claim 3 where said first lens unit is a single element and satisfies the condition $$|K_{CA}/K_A| > 0.8$$

where $K_{CA}$ is the optical power of said meniscus element of said first lens unit at the clear aperture thereof and $K_A$ is the optical power of said meniscus element of said first lens unit at the optical axis thereof.

19. The projection lens of claim 1 wherein said meniscus lens element of said first lens unit and said corrector lens unit are both convex to said second lens unit.

20. The projection lens of claim 3 wherein said meniscus lens element of said first lens unit and said corrector lens unit are both convex to said second lens unit.

21. The projection lens of claim 4 wherein said meniscus lens element of said first lens unit and said corrector lens unit are both convex to said second lens unit.

22. The projection lens of claim 5 wherein said meniscus lens element of said first lens unit and said corrector lens unit are both convex to said second lens unit.

23. The projection lens of claim 1 where said first lens unit is a meniscus element convex to the image side thereof with an aspheric surface which becomes concave to the image adjacent the clear aperture.

24. The projection lens of claim 1 where said first lens unit consists of a single element and satisfies the condition $$|K_{CA}/K_A| > 0.8$$

where $K_{CA}$ is the optical power of said meniscus element of said first lens unit at the clear aperture thereof and $K_A$ is the optical power of said meniscus element at the optical axis thereof.

25. The projection lens of claim 3 where said first lens unit consists of a single element and satisfies the condition $$|K_{CA}/K_A| > 0.8$$

where $K_{CA}$ is the optical power of said meniscus element of said first lens unit at the clear aperture thereof and $K_A$ is the optical power of said meniscus element at the optical axis thereof.

26. The lens of claim 1 where said second lens unit consists of a a biconvex element and another positive element.

27. The lens of claim 26 where the elements of said second lens unit have spheric surfaces.

28. The lens of claim 3 where the elements of said second lens unit have spheric surfaces.

29. The lens of claim 4 where the elements of said second lens unit have spheric surfaces.

30. The lens of claim 1 where said biconvex element of said second lens unit has spherical surfaces and is formed of glass.

31. The lens of claim 1 where said second lens unit comprises a plurality of lens units, all of which are glass and have spheric surfaces.

32. The lens of claim 1 where said corrector lens unit consists of a single element having surfaces which are defined at the optical axis on radii which are substantially equal to or greater than the equivalent focal length of said lens and said single element being biconvex at the optical axis.

33. A projection lens for use in combination with a cathode ray tube, which lens is positioned closely adjacent the faceplate of the cathode ray tube, said lens comprising three lens units, the first lens unit from the image end including an overall meniscus shaped element of weak positive optical power at the optical axis of said lens and having at least one aspheric surface, a second lens unit consisting of a biconvex element which supplies the majority of the positive optical power of said lens, a third lens unit closely adjacent said cathode ray tube and having a strongly concave image side surface and serving as a field flattener, said lens further comprising a corrector lens unit having at least one aspheric surface positioned between said second and third lens units, said first lens unit being spaced from second lens unit $$0.5 > |D_{12}/F_3| > 0.1$$

where $D_{12}$ is the axial distance between said first and second lens units and $F_3$ is the equivalent focal length of said third lens unit, and $$0.4 > D_{2C}/F_0 > 0.1$$

where $D_{2C}$ is the axial distance between said second lens unit and said corrector lens unit, and $F_0$ is the equivalent focal length of the lens.

34. The lens of claim 33 where said corrector lens unit consists of a single element having two aspheric surfaces and $$K_C/K_0 < 0.3$$

where $K_C$ is the optical power of said corrector lens unit and $K_0$ is the optical power of said lens.

35. The lens of claim 34 where $$0.92 \geqq 2H/CA > 0.5$$

where CA is the clear aperture of said corrector lens unit and H is the height from the optical axis of said lens at which the axial marginal rays as traced from the long conjugate of said lens intersect the image side surface of said corrector lens unit.

36. The projection lens of claim 33 further including another corrector lens unit consisting of a meniscus element having at least one aspheric surface positioned closely adjacent said second lens unit and being convex toward said second lens unit.

37. The projection lens of claim 36 where said another corrector lens unit is on the image side of said second lens unit and is part of said first lens unit.

38. The projection lens of claim 36 where said another corrector lens unit is on the object side of said second lens unit.

39. The projection lens of claim 33 where said first lens unit consists of a single element and satisfies the condition $$|K_{CA}/K_A| > 0.8$$

where $K_{CA}$ is the optical power of said meniscus element of said first lens unit at the clear aperture thereof and $K_A$ is the optical power of said meniscus element of said first lens unit at the optical axis thereof.

40. The projection lens of claim 33 wherein said meniscus lens element of said first lens unit and said corrector lens unit are both convex to said second lens unit.

41. The projection lens of claim 33 where said first lens unit is a meniscus element convex to the image side thereof with an aspheric surface which becomes concave to the image adjacent the clear aperture.

42. The projection lens of claim 33 where $$|K_{CA}/K_A| > 0.8$$

where $K_{CA}$ is the optical power of said meniscus element of said first lens unit at the clear aperture thereof and $K_A$ is the optical power of said meniscus element at the optical axis thereof.

43. The lens of claim 33 where said corrector lens unit consists of a single element having two aspheric surfaces, and said second lens unit consists of a single biconvex element.

44. The lens of claim 33 where the surfaces of said biconvex element are spheric.

45. The lens of claim 33 where said first lens unit consists of a single element which is of positive optical power at the optical axis and changes to negative optical power adjacent its clear aperture, and has two aspheric surfaces.

46. The lens of claim 33 where said corrector lens unit consists of a single element having two aspheric surfaces.

47. The lens of claim 46 where said corrector lens unit has surfaces which are defined at the optical axis on radii which are substantially equal to or greater than the equivalent focal length of said lens.

48. The lens of claim 33 where said corrector lens unit consists of a single element having surfaces which are defined at the optical axis on radii which are substantially equal to or greater than the equivalent focal length of said lens, and both of said surfaces are aspheric.

49. The lens of claim 33 where said first lens unit and said corrector lens unit each consist of single elements.

50. The lens of claim 49 where both of said first lens unit and said corrector lens unit have two aspheric surfaces.

51. The lens of claim 33 satisfying the condition $$0.92 \geqq 2H/CA > 0.5$$

where CA is the clear aperture of the image side surface of said corrector lens unit and H is the height on the image side surface of said corrector lens unit measured from the optical axis where the axial marginal rays passing from said second lens unit as traced from the long conjugate intersect said image side surface of said corrector lens unit.

52. The projection lens of claim 46 wherein said meniscus lens element of said first lens unit and said corrector lens unit are both convex to said second lens unit.

53. The projection lens of claim 47 wherein said meniscus lens element of said first lens unit and said corrector lens unit are both convex to said second lens unit.

54. The lens of claim 33 where said corrector lens unit consists of a single element having surfaces which are defined at the optical axis on radii which are substantially equal to or greater than the equivalent focal length of said lens, said element being biconvex at the optical axis.

55. The lens of claim 33 where said biconvex element of said second lens unit has spherical surfaces and is formed of glass.

56. The lens of claim 33 where said second lens unit comprises a plurality of lens units, all of which are glass and have spheric surfaces.

57. A projection lens for use in combination with a cathode ray tube which lens is positioned closely adjacent the faceplate of the cathode ray tube, said lens comprising of three lens units, the first lens unit from the image end including an overall meniscus shaped element of weak optical power at the optical axis of said lens and having at least one aspheric surface, a second lens unit consisting of a biconvex element which supplies the majority of the positive optical power of said lens, said first lens unit being spaced from said second lens unit $$0.5 > |D_{12}/F_3| > 0.1$$

where $D_{12}$ is the axial distance between said first and second lens units and $F_3$ is the equivalent focal length of said first lens unit, a third lens unit closely adjacent said cathode ray tube and having a strongly concave image side surface and serving as a field flattener, said lens further comprising a corrector lens element having two aspheric surfaces positioned between said second and third lens units, said corrector lens unit consisting of a single unit spaced from said second lens unit $$0.4 > D_{2C}/F_0 > 0.1$$

where $D_{2C}$ is the axial distance between said second lens unit and said corrector lens unit, $F_0$ is the equivalent focal length of said projection lens, and the surfaces of said corrector lens element are defined at the optical axis on radii which are substantially equal to or greater than the equivalent focal length of the lens, the positioning and shape of said corrector lens element from said second lens unit being such that the axial marginal rays from said second lens unit as traced from the long conjugate intersect the image side surface of said corrector lens unit at a height H from the optical axis that is less than the clear aperture of the image side surface of said corrector lens unit but at a height which will not affect the contribution of said corrector lens unit for correction of aperture dependent aberrations, said surfaces of said corrector lens unit above the height H being configured beyond said height H to contribute to correction of aberrations due to off-axis rays.

58. The projection lens of claim 57 where said corrector lens unit is biconvex at the optical axis.

59. The projection lens of claim 57 where said first lens unit consists of a single element having two aspheric surfaces, and said element is of positive optical power at the optical axis and changes to negative optical power adjacent the clear aperture.

60. The projection lens of claim 57 further including another corrector lens unit consisting of a meniscus element having at least one aspheric surface positioned closely adjacent said second lens unit and being convex toward said second lens unit.

61. The projection lens of claim 60 where said another corrector lens unit is on the image side of said second lens unit and is part of said first lens unit.

62. The projection lens of claim 60 where said another corrector lens unit is on the object side of said second lens unit.

63. The projection lens of claim 57 where said first lens unit is a single element and satisfies the condition $$|K_{CA}/K_A| > 0.8$$

where $K_{CA}$ is the optical power of said meniscus element of said first lens unit at the clear aperture thereof and $K_A$ is the optical power of said meniscus element of said first lens unit at the optical axis thereof.

64. The projection lens of claim 57 wherein said meniscus lens element of said first lens unit and said corrector lens unit are both convex to said second lens unit.

65. The lens of claim 57 where said biconvex element of said second lens unit has spherical surfaces and is formed of glass.

66. The lens of claim 57 where said second lens unit comprises a plurality of lens units, all of which are glass and have spheric surfaces.

67. A projection lens for use in combination with a cathode ray tube, which lens is positioned closely adjacent the faceplate of the cathode ray tube, said lens comprising from the image end a first lens unit of overall meniscus shape of weak positive optical power at the optical axis of said lens and having at least one aspheric surface, a second lens unit comprising a biconvex element which supplies the majority of the positive optical power of said lens, a third corrector lens unit having at least one aspheric surface, and a fourth lens unit closely adjacent the cathode ray tube having a strongly concave image side surface and serving as a field flattener, said first lens unit being spaced from second lens unit $$0.5 > |D_{12}/F_4| > 0.1$$

where $D_{12}$ is the axial distance between said first and second lens units and $F_4$ is the equivalent focal length of said fourth lens unit, and $$0.4 > D_{2C}/F_0 > 0.1$$

where $D_{2C}$ is the axial distance between said second lens unit and said third corrector lens unit, and $F_0$ is the equivalent focal length of the lens.

68. The lens of claim 67 where said third corrector lens unit consists of a single element having two aspheric surfaces and $$K_C/K_0 > 0.3$$

where $K_C$ is the optical power of said corrector lens unit and $K_0$ is the optical power of said lens.

69. The lens of claim 68 where $$0.92 \geq 2H/CA > 0.5$$

where CA is the clear aperture of said corrector lens unit and H is the height from the optical axis of said lens at which the axial marginal rays as traced from the long conjugate of said lens intersect the image side surface of said third corrector lens unit.

70. The projection lens of claim 67 further including another corrector lens unit consisting of a meniscus element having at least one aspheric surface positioned closely adjacent said second lens unit and being convex toward said second lens unit.

71. The projection lens of claim 70 where said meniscus element of said another corrector lens unit is on the image side of said second lens unit and is part of said first lens unit.

72. The projection lens of claim 70 where said another corrector lens unit is on the object side of said second lens unit.

73. The projection lens of claim 68 where said first lens unit consists of a single element and satisfies the condition $$|K_{CA}/K_A| > 0.8$$

where $K_{CA}$ is the optical power of said meniscus element of said first lens unit at the clear aperture thereof and $K_A$ is the optical power of said meniscus element of said first lens unit at the optical axis thereof.

74. The projection lens of claim 67 wherein said first lens unit consists of a single meniscus lens element and said first lens unit and said third corrector lens unit are both convex to said second lens unit.

75. The projection lens of claim 67 where said first lens unit is a meniscus element convex to the image side thereof with an aspheric surface which becomes concave to the image adjacent the clear aperture.

76. The projection lens of claim 75 where $$|K_{CA}/K_A| > 0.8$$

where $K_{CA}$ is the optical power of said meniscus element of said first lens unit at the clear aperture thereof and $K_A$ is the optical power of said meniscus element at the optical axis thereof.

77. The lens of claim 67 where said corrector lens unit consists of a single element having two aspheric surfaces, and said second lens unit consists of a single biconvex element.

78. The lens of claim 67 where the surfaces of said biconvex element are aspheric.

79. The lens of claim 67 where said first lens unit consists of a single element which is of positive optical power at the optical axis and changes to negative optical power adjacent its clear aperture, and has two aspheric surfaces.

80. The lens of claim 67 where said third corrector lens unit consists of a single element having two aspheric surfaces.

81. The lens of claim 80 where said third corrector lens unit has surfaces which are defined at the optical axis on radii which are substantially equal to or greater than the equivalent focal length of said lens.

82. The lens of claim 67 where said third corrector lens unit consists of a single element having surfaces which are defined at the optical axis on radii which are substantially equal to or greater thant the equivalent focla length of said lens, and both of said surfaces are aspheric.

83. The lens of claim 67 where said first lens unit and said third corrector lens unit each consist of single elements.

84. The lens of claim 83 where both of said first lens unit and said third corrector lens unit have two aspheric surfaces.

85. The lens of claim 67 satisfying the condition $$0.92 \geqq 2H/CA > 0.5$$

where CA is the clear aperture of the image side surface of said corrector lens unit and H is the height on the image side surface of said corrector lens unit measured from the optical axis where the axial marginal rays passing from said second lens unit as traced from the long conjugate intersect said image side surface of said corrector lens unit.

86. The projection lens of claim 80 wherein said first lens unit and said corrector lens unit are both convex to said second lens unit.

87. The projection lens of claim 81 wherein said first lens unit and said corrector lens unit are both convex to said second lens unit.

88. The lens of claim 67 where said corrector lens unit consists of a single element having surfaces which are defined at the optical axis on radii which are substantially equal to or greater than the equivalent focal length of said lens, said element being biconvex at the optical axis.

* * * * *

UNITED STATES PATENT AND TRADEMARK OFFICE
CERTIFICATE OF CORRECTION

PATENT NO. : 4,776,681
DATED : OCTOBER 11, 1988
INVENTOR(S) : JACOB MOSKOVICH

It is certified that error appears in the above-identified patent and that said Letters Patent are hereby corrected as shown below:

<u>IN THE CLAIMS</u>

Claim 1, Column 18, Line 8: change "consisting of" to --comprising--.

Claim 14, Column 19, Line 28: change "secod" to --second--.

Claim 57, Column 22, Line 51: after "comprising" delete "of".

Signed and Sealed this

Twenty-first Day of February, 1989

Attest:

DONALD J. QUIGG

Attesting Officer     Commissioner of Patents and Trademarks

(12) EX PARTE REEXAMINATION CERTIFICATE (5221st)
United States Patent
Moskovich

(10) Number: US 4,776,681 C1
(45) Certificate Issued: Oct. 25, 2005

(54) PROJECTION LENS

(75) Inventor: Jacob Moskovich, Cincinnati, OH (US)

(73) Assignee: 3M Innovative Properties Company, St. Paul, MN (US)

Reexamination Request:
No. 90/006,993, Apr. 2, 2004

Reexamination Certificate for:
Patent No.: 4,776,681
Issued: Oct. 11, 1988
Appl. No.: 06/899,543
Filed: Aug. 22, 1986

Certificate of Correction issued Feb. 21, 1989.

Related U.S. Application Data

(63) Continuation-in-part of application No. 06/820,553, filed on Jan. 17, 1986, now Pat. No. 4,685,774.

(51) Int. Cl.$^7$ .............................. G02B 3/00; G02B 9/00
(52) U.S. Cl. ..................... 359/649; 359/650; 359/708; 359/756; 359/763; 359/771

(56) References Cited

U.S. PATENT DOCUMENTS

| 4,469,413 A | 9/1984 | Shirayanagi | ................. 359/718 |
|---|---|---|---|
| 4,682,861 A | 7/1987 | Hosoya | ........................ 359/650 |
| 4,699,476 A | 10/1987 | Clarke | .......................... 359/650 |
| 4,753,519 A | 6/1988 | Miyatake | ...................... 359/650 |
| 4,810,075 A | 3/1989 | Fukuda | ........................ 359/650 |

*Primary Examiner*—Jordan M. Schwartz

(57) ABSTRACT

A projection lens for a cathode ray tube consisting from the image end of a first lens unit including an element of overall meniscus shape and of positive power at the optical axis, a second lens unit which includes of a bi-convex element and supplies the majority of the positive optical power of the lens, the biconvex element being of glass and having spheric surfaces, a third lens unit adjacent the cathode ray tube having a strongly concave image side surface and serving as a field flattener, and a corrector lens unit having at least one aspheric surface, the corrector unit being axially spaced from the second lens unit a distance such that the axial marginal rays from the second lens unit, as traced from the long cojugate intersect the image side surface of the corrector unit at a height from the optical axis that is less than the clear aperture of said corrector lens unit. The corrector lens unit is shaped to correct for off-axis aberrations above the intersection. The first lens unit is of a positive power which will converge rays as traced from the long conjugate and thereby reduce the diameter of the second lens unit.

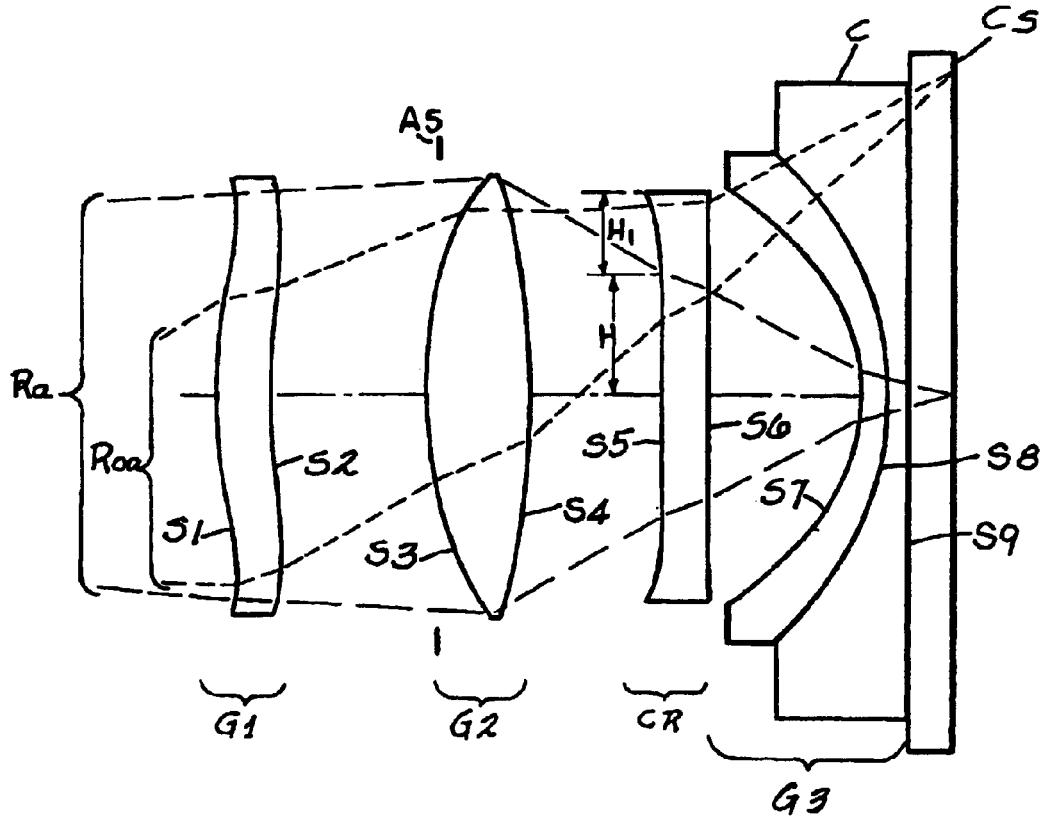

EX PARTE REEXAMINATION CERTIFICATE ISSUED UNDER 35 U.S.C. 307

THE PATENT IS HEREBY AMENDED AS INDICATED BELOW.

Matter enclosed in heavy brackets [ ] appeared in the patent, but has been deleted and is no longer a part of the patent; matter printed in italics indicates additions made to the patent.

AS A RESULT OF REEXAMINATION, IT HAS BEEN DETERMINED THAT:

The patentability of claims 14–16, 19, 32, 36–38, 40, 54, 58, 60–62, 64, 70–72, 74 and 88 is confirmed.

Claims 1, 33, 57, 67 and 78 are cancelled.

Claims 2, 4, 6, 7, 9, 10, 12, 17, 20–24, 26, 30, 31, 34, 39, 41–46, 48, 49, 51–53, 55, 56, 59, 63, 65, 66, 68, 75, 77, 79, 80, 82, 83 and 85–87 are determined to be patentable as amended.

Claims 3, 5, 8, 11, 13, 18, 25, 27–29, 35, 47, 50, 69, 73, 76, 81 and 84, dependent on an amended claim, are determined to be patentable.

New claims 89–92 are added and determined to be patentable.

2. The lens of claim [1] *89* where said first lens unit consists of a single element which is of positive optical power at the optical axis and changes to negative optical power adjacent its clear aperture.

4. The lens of claim [1] *89* where said corrector lens unit consists of a single element having two aspheric surfaces.

6. The lens of claim [1] *89* where said corrector lens unit has surfaces which are defined at the optical axis on radii which are substantially equal to or greater than the equivalent focal length of said lens.

7. The lens of claim [1] *89* where said first lens unit and said corrector lens unit each consist of single elements.

9. The lens of claim [1] *89* satisfying the condition $$0.92 \geq 2H/CA < 0.5$$

where CA is the clear aperture of the image side surface of said corrector lens unit.

10. The lens of claim [1] *89* satisfying the condition $$0.4 > D_{2C}/F_0 > 0.1$$

where $D_{2C}$ is the axial distance between said second lens unit and said corrector lens unit and $F_0$ is the equivalent focal length of the lens.

12. The lens of claim 7 satisfying the condition $$0.4 > D_{2C}/F_0 > 0.1$$

where $D_{2C}$ is the axial distance between said second lens unit and said corrector lens unit and $F_0$ is the equivalent focal length of the lens.

17. The projection lens of claim [1] *89* where said first lens unit is a single element and satisfies the condition $$|K_{CA}/K_A| > 0.8$$

where $K_{CA}$ is the optical power of said meniscus element of said first lens unit at the clear aperture thereof and $K_A$ is the optical power of said meniscus element of said first lens unit at the optical axis thereof.

20. The projection lens of claim [3] *1* wherein said meniscus lens element of said first lens unit and said corrector lens unit are both convex to said second lens unit, *where said first lens unit consists of a single element which is of positive optical power at the optical axis and changes to negative optical power adjacent its clear aperture, and where said first lens unit has two aspheric surfaces.*

21. The projection lens of claim [4] *1* wherein said meniscus lens element of said first lens unit and said corrector lens unit are both convex to said second lens unit, *and where said corrector lens unit consists of a single element having two aspheric surfaces.*

22. The projection lens of claim [5] *1* wherein said meniscus lens element of said first lens unit and said corrector lens unit are both convex to said second lens unit, *and where said corrector lens unit has surfaces which are defined at the optical axis on radii which are substantially equal to or greater than the equivalent focal length of said lens, and where said corrector lens unit consists of a single element having two aspheric surfaces.*

23. The projection lens of claim [1] *89* where said first lens unit is a meniscus element convex to the image side thereof with an aspheric surface which becomes concave to the image adjacent the clear aperture.

24. The projection lens of claim [1] *89* where said first lens unit consists of a single element and satisfies the condition $$|K_{CA}/K_A| > 0.8$$

where $K_{CA}$ is the optical power of said meniscus element of said first lens unit at the clear aperture thereof and $K_A$ is the optical power of said meniscus element at the optical axis thereof.

26. The lens of claim [1] *89* where said second lens unit consists of a [a] biconvex element and another positive element.

30. The lens of claim [1] *89* where said biconvex element of said second lens unit has spherical surfaces and is formed of glass.

31. The lens of claim [1] *89* where said second lens unit comprises a plurality of lens units, all of which are glass and have spheric surfaces.

34. The lens of claim [33] *90* where said corrector lens unit consists of a single element having two aspheric surfaces [and $$K_C/K_0 < 0.3$$

where $K_C$ is the optical power of said corrector lens unit and $K_0$ is the optical power of said lens].

39. The projection lens of claim [33] *90* where said first lens unit consists of a single element and satisfies the condition $$|K_{CA}/K_A| > 0.8$$

where $K_{CA}$ is the optical power of said meniscus element of said first lens unit at the clear aperture thereof and $K_A$ is the optical power of said meniscus element of said first lens unit at the optical axis thereof.

41. The projection lens of claim [33] *90* where said first lens unit is a meniscus element convex to the image side thereof with an aspheric surface which becomes concave to the image adjacent the clear aperture.

42. The projection lens of claim [33] *90* where $$|K_{CA}/K_A|>0.8$$

where $K_{CA}$ is the optical power of said meniscus element of said first lens unit at the clear aperture thereof and $K_A$ is the optical power of said meniscus element at the optical axis thereof.

43. The lens of claim [33] *90* where said corrector lens unit consists of a single element having two aspheric surfaces, and said second lens unit consists of a single biconvex element.

44. The lens of claim [33] *90* where the surfaces of said biconvex element are spheric.

45. The lens of claim [33] *90* where said first lens unit consists of a single element which is of positive optical power at the optical axis and changes to negative optical power adjacent its clear aperture, and has two aspheric surfaces.

46. The lens of claim [33] *90* where said corrector lens unit consists of a single element having two aspheric surfaces.

48. The lens of claim [33] *90* where said corrector lens unit consists of a single element having surfaces which are defined at the optical axis on radii which are substantially equal to or greater than the equivalent focal length of said lens, and both of said surfaces are aspheric.

49. The lens of claim [33] *90* where said first lens unit and said corrector lens unit each consist of single elements.

51. The lens of claim [33] *90* satisfying the condition $$0.92 \geq 2H/CA > 0.5$$

where CA is the clear aperture of the image side surface of said corrector lens unit and H is the height on the image side surface of said corrector lens unit measured from the optical axis where the axial marginal rays passing from said second lens unit as traced from the long conjugate intersect said image side surface of said corrector lens unit.

52. The projection lens of claim [46] *33* wherein said meniscus lens element of said first lens unit and said corrector lens unit are both convex to said second lens unit, *and where said corrector lens unit consists of a single element having two aspheric surfaces.*

53. The projection lens of claim [47] *33* wherein said meniscus lens element of said first lens unit and said corrector lens unit are both convex to said second lens unit, *and where said corrector lens unit consists of a single element having two aspheric surfaces and where said corrector lens unit has surfaces which are defined at the optical axis on radii which are substantially equal to or greater than the equivalent focal length of said lens.*

55. The lens of claim [33] *90* where said biconvex element of said second lens unit has spherical surfaces and is formed of glass.

56. The lens of claim [33] *90* where said second lens unit comprises a plurality of lens units, all of which are glass and have spheric surfaces.

59. The projection lens of claim [57] *91* where said first lens unit consists of a single element having two aspheric surfaces, and said element is of positive optical power at the optical axis and changes to negative optical power adjacent the clear aperture.

63. The projection lens of claim [57] *91* where said first lens unit is a single element and satisfies the condition $$|K_{CA}/K_A|>0.8$$

where $K_{CA}$ is the optical power of said meniscus element of said first lens unit at the clear aperture thereof and $K_A$ is the optical power of said meniscus element of said first lens unit at the optical axis thereof.

65. The lens of claim [57] *91* where said biconvex element of said second lens unit has spherical surfaces and is formed of glass.

66. The lens of claim [57] *91* where said second lens unit comprises a plurality of lens units, all of which are glass and have spheric surfaces.

68. The lens of claim [67] *92* where said third connector lens unit consists of a single element having two aspheric surfaces and $K_C/K_0$[>] *is less than* 0.3 where $K_C$ is the optical power of said corrector lens unit and $K_0$ is the optical power of said lens.

75. The projection lens of claim [67] *92* where said first lens unit is a meniscus element convex to the image side thereof with an aspheric surface which becomes concave to the image adjacent the clear aperture.

77. The lens of claim [67] *92* where said corrector lens unit consists of a single element having two aspheric surfaces, and said second lens unit consists of a single biconvex element.

79. The lens of claim [67] *92* where said first lens unit consists of a single element which is of positive optical power at the optical axis and changes to negative optical power adjacent its clear aperture, and has two aspheric surfaces.

80. The lens of claim [67] *92* where said third corrector lens unit consists of a single element having two aspheric surfaces.

82. The lens of claim [67] *92* where said third corrector lens unit consists of a single element having surfaces which are defined at the optical axis on radii which are substantially equal to or greater [thant] *than* the equivalent [focla] *focal* length of said lens, and both of said surfaces are aspheric.

83. The lens of claim [67] *92* where said first lens unit and said third corrector lens unit each consist of single elements.

85. The lens of claim [67] *92* satisfying the condition $$0.92 \geq 2H/CA > 0.5$$

where CA is the clear aperture of the image side surface of said corrector lens unit and H is the height on the image side surface of said corrector lens unit measured from the optical axis where the axial marginal rays passing from said second lens unit as traced from the long conjugate intersect said image side surface of said corrector lens unit.

86. The projection lens of claim [80] *67* wherein said first lens unit and said corrector lens unit are both convex to said second lens unit, *and where said third corrector lens unit consists of a single element having two aspheric surfaces.*

87. The projection lens of claim [81] *67* wherein said first lens unit and said corrector lens unit are both convex to said second lens unit, *and where said third corrector lens unit consists of a single element having two aspheric surfaces,* and where said third corrector lens unit has surfaces which are defined at the optical axis on radii which are substantially equal to or greater than the equivalent focal length of said lens.

89. A projection lens for use in combination with a cathode ray tube, which lens is positioned closely adjacent the faceplate of the cathode ray tube, said lens comprising three lens units, the first lens unit from the image end including an overall meniscus shaped element of weak positive optical power at the optical axis of said lens and having at least one aspheric surface, a second lens unit comprising a biconvex element which supplies the majority of the positive optical power of said lens, a third lens unit closely adjacent said cathode ray tube and having a strongly concave image side surface and serving as a field flattener, said lens further comprising a corrector lens unit having at least one aspheric surface positioned between said second and third lens units, said corrector lens unit being concave to the second lens unit and $$K_C/K_0<0.3$$

where $K_C$ is the optical power of said corrector lens unit and $K_0$ is the optical power of said lens, said first and second lens units being axially spaced $$0.5>|D_{12}/F_3|>0.1$$

where $D_{12}$ is the axial spacing between said first and second lens units and $F_3$ is the equivalent focal length of said third lens unit, said corrector lens unit being constructed, arranged and spaced from said second lens unit such that the axial marginal rays from said second lens unit as traced from the long conjugate intersect the image side surface of said corrector lens unit at a height H from the optical axis that is less than the clear aperture of the image side surface of said corrector lens unit but at a height which will not affect the contribution of said corrector lens unit for correction of aperture dependent aberrations, said surfaces of said corrector lens unit above the height H being configured beyond said height H to contribute to correction of aberrations due to off-axis rays.

90. A projection lens for use in combination with a cathode ray tube, which lens is positioned closely adjacent the faceplate of the cathode ray tube, said lens comprising three lens units, the first lens unit from the image end including an overall meniscus shaped element of weak positive optical power at the optical axis of said lens and having at least one aspheric surface, a second lens unit consisting of a biconvex element which supplies the majority of the positive optical power of said lens, a third lens unit closely adjacent said cathode ray tube and having a strongly concave image side surface and serving as a field flattener, said lens further comprising a corrector lens unit having at least one aspheric surface positioned between said second and third lens units, said corrector lens unit being concave to the second lens unit and $$K_C/K_0<0.3$$

where $K_C$ is the optical power of said corrector lens unit and $K_0$ is the optical power of said lens, said first lens unit being spaced from second lens unit $$0.5>|D_{12}/F_3|>0.1$$

where $D_{12}$ is the axial distance between said first and second lens units and $F_3$ is the equivalent focal length of said third lens unit, and $$0.4>D_{2C}/F_0>0.1$$

where $D_{2C}$ is the axial distance between said second lens unit and said corrector lens unit, and $F_0$ is the equivalent focal length of the lens.

91. A projection lens for use in combination with a cathode ray tube which lens is positioned closely adjacent the faceplate of the cathode ray tube, said lens comprising of three lens units, the first lens unit from the image end including an overall meniscus shaped element of weak optical power at the optical axis of said lens and having at least one aspheric surface, a second lens unit consisting of a biconvex element which supplies the majority of the positive optical power of said lens, said first lens unit being spaced from said second lens unit $$0.5>|D_{12}/F_3|>0.1$$

where $D_{12}$ is the axial distance between said first and second lens units and $F_3$ is the equivalent focal length of said third lens unit, a third lens unit closely adjacent said cathode ray tube and having a strongly concave image side surface and serving as a field flattener, said lens further comprising a corrector lens element having two aspheric surfaces positioned between said second and third lens units, said corrector lens unit consisting of a single unit spaced from said second lens unit $$0.4>D_{2C}/F_0>0.1$$

where $D_{2C}$ is the axial distance between said second lens unit and said corrector lens unit, $F_0$ is the equivalent focal length of said projection lens, and the surfaces of said corrector lens element are defined at the optical axis on radii which are substantially equal to or greater than the equivalent focal length of the lens, said corrector lens unit being concave to the second lens unit and $$K_c/K_0<0.3$$

where $K_C$ is the optical power of said corrector lens unit and $K_0$ is the optical power of said lens, the positioning and shape of said corrector lens element from said second lens unit being such that the axial marginal rays from said second lens unit as traced from the long conjugate intersect the image side surface of said corrector lens unit at a height H from the optical axis that is less than the clear aperture of the image side surface of said corrector lens unit but at a height which will not affect the contribution of said corrector lens unit for correction of aperture dependent aberrations, said surfaces of said corrector lens unit above the height H being configured beyond said height H to contribute to correction of aberrations due to off-axis rays.

92. A projection lens for use in combination with a cathode ray tube, which lens is positioned closely adjacent the faceplate of the cathode ray tube, said lens comprising from the image end a first lens unit of overall meniscus shape of weak positive optical power at the optical axis of said lens and having at least one aspheric surface, a second lens unit comprising a biconvex element which supplies the majority of the positive optical power of said lens, a third corrector lens unit having at least one aspheric surface, said third corrector lens unit being concave to the second lens unit and $K_C/K_0 < 0.3$ where $K_C$ is the optical power of said third corrector lens unit and $K_0$ is the optical power of said lens, and a fourth lens unit closely adjacent the cathode ray tube having a strongly concave image side surface and serving as a field flattener, said first lens unit being spaced from second lens unit $0.5 > |D_{12}/F_4| > 0.1$ where $D_{12}$ is the axial distance between said first and second lens units and $F_4$ is the equivalent focal length of said fourth lens unit, and $0.4 > D_{2C}/F_0 > 0.1$ where $D_{2C}$ is the axial distance between said second lens unit and said third corrector lens unit, and $F_0$ is the equivalent focal length of the lens.

* * * * *